United States Patent
Welk et al.

(10) Patent No.: US 11,953,759 B2
(45) Date of Patent: Apr. 9, 2024

(54) METHOD FOR TAKING INTO CONSIDERATION DIFFERENT LONG-DISTANCE AND SHORT-DISTANCE PRISMATIC CORRECTIONS

(71) Applicant: Rodenstock GmbH, Munich (DE)

(72) Inventors: Andrea Welk, Munich (DE); Anne Seidemann, Munich (DE); Helmut Altheimer, Baisweil-Lauchdorf (DE); Yohann Bénard, Munich (DE); Adam Muschielok, Munich (DE); Gregor Esser, Munich (DE); Wolfgang Becken, Neuried (DE)

(73) Assignee: Rodenstock GmbH, Munich (DE)

( * ) Notice: Subject to any disclaimer, the term of this patent is extended or adjusted under 35 U.S.C. 154(b) by 1289 days.

(21) Appl. No.: 16/480,501

(22) PCT Filed: Jan. 16, 2018

(86) PCT No.: PCT/EP2018/050949
§ 371 (c)(1),
(2) Date: Nov. 8, 2019

(87) PCT Pub. No.: WO2018/137962
PCT Pub. Date: Aug. 2, 2018

(65) Prior Publication Data
US 2023/0333408 A1    Oct. 19, 2023

(30) Foreign Application Priority Data

Jan. 27, 2017   (DE) .......................... 102017000777.2

(51) Int. Cl.
G02C 7/02    (2006.01)
G02C 7/06    (2006.01)

(52) U.S. Cl.
CPC ............. *G02C 7/027* (2013.01); *G02C 7/061* (2013.01)

(58) Field of Classification Search
None
See application file for complete search history.

(56) References Cited

U.S. PATENT DOCUMENTS

| | | | |
|---|---|---|---|
| 8,042,940 B2 | 10/2011 | Krall et al. | |
| 8,287,124 B2 | 10/2012 | Krall et al. | |
| 2010/0296052 A1* | 11/2010 | Esser | G02C 7/02 703/2 |
| 2015/0036102 A1 | 2/2015 | Ghosh et al. | |

FOREIGN PATENT DOCUMENTS

| | | |
|---|---|---|
| DE | 102006030204 A1 | 1/2008 |
| DE | 102008057205 A1 | 5/2010 |
| DE | 102011009473 A1 | 11/2011 |
| DE | 102010021763 A1 | 12/2011 |
| EP | 2363743 A1 | 9/2011 |
| EP | 1590700 B1 | 11/2013 |
| EP | 2356507 B1 | 11/2013 |
| JP | H1195175 A | 4/1999 |
| JP | H11295670 A | 10/1999 |
| JP | 2000199877 A | 7/2000 |

OTHER PUBLICATIONS

European Patent Office, International Search Report issued for PCT/EP2018/050949, 6 pgs., dated Apr. 16, 2018.

* cited by examiner

*Primary Examiner* — Darryl J Collins
(74) *Attorney, Agent, or Firm* — Banner & Witcoff Ltd.

(57) ABSTRACT

A computer-implemented method, including: capturing a nominal refractive power and/or a nominal astigmatism in a near reference point of the lens, determining a corrective value of the vertical or horizontal prism in the near reference point of the lens; modifying the nominal refractive power and/or the nominal astigmatism in the near reference point on the basis of the corrective value of the vertical or horizontal prism of the lens; determining a continuous course of the nominal refractive power or the nominal astigmatism along the main line of the lens on the basis of the modified refractive power and/or nominal astigmatism in the near reference point; and calculating or optimizing the lens on the basis of the modified nominal refractive power and/or nominal astigmatism in the near reference point and the determined course of the nominal refractive power and/or the nominal astigmatism along the main line.

16 Claims, 28 Drawing Sheets

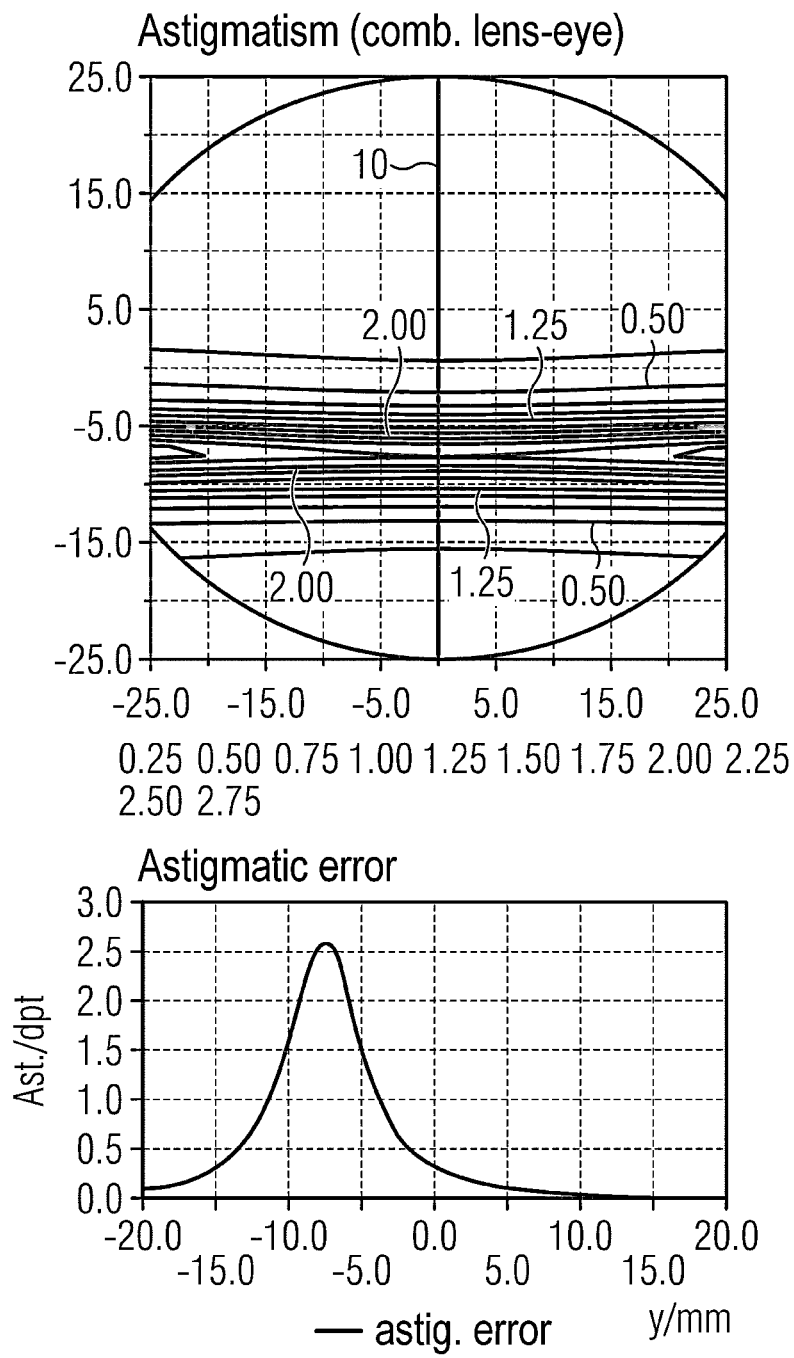

R +2.00 Add. 2.0 dpt
Astigmatism (comb. lens-eye)

L Plan Add. 2.0 dpt
Astigmatism (comb. lens-eye)

R +2.00 Add. 2.0 dpt
Astigmatism (comb. lens-eye)

L Plan Add. 2.0 dpt
Astigmatism (comb. lens-eye)

Overlay surface for different near prism

Vertical prism nearby (base 90°)

Prism = -0.80          -7.00

○ 0 off
○ 1 Bend
○ 2 Circular arc
● 3 cont (dz/dy=b*Arctan(a*y))    yF= 0.00    yN= -14.00    Width a 0.40
☐ horizontal correction                                      Factor 0.50

Horizontal prism in the vicinity (base 0°)

● 0 off          Prism =   2.00
○ 1 Bend         Center y0= -4.00
○ 2 ArcTan       Width a0=  0.20

Exit                                    Cancel

Fig. 20

Distant

Start refraction

| | Right eye | Left eye |
|---|---|---|
| Sphere | 5.00 | 3.00 |
| Cylinder | 1.50 | 1.25 |
| Axis | 10.00 | 15.00 |
| Add | 2.00 | 2.00 |

Final refraction

| | Right eye | Left eye |
|---|---|---|
| Sphere | 5.00 | 3.00 |
| Cylinder | 1.50 | 1.25 |
| Axis | 10.00 | 15.00 |
| Add | 1.02 | 2.53 |

Proximity

Personnal Eye Model ☐

Start refraction

| | Right eye | Left eye |
|---|---|---|
| Sphere | 7.00 | 5.00 |
| Cylinder | 1.50 | 1.25 |
| Axis | 10.00 | 15.00 |

Final refraction

| | Right eye | Left eye |
|---|---|---|
| Sphere | 6.39 | 5.04 |
| Cylinder | 0.76 | 2.23 |
| Axis | 68.70 | 8.13 |

Prism difference (proximity) 3.06 cm/m  Prism difference (proximity) 0.63 cm/m

- ● Both eyes
- ○ Right eye
- ○ Left eye

- ● Sphere and cylinder
- ○ Sphere only
- ○ Cylinder only

[Options] [Minimize] [Close]

0 ———————————————— 41 ——— 
Leave 21 % of prism difference=> 0.63 cm/m

Fig. 21

METHOD FOR TAKING INTO CONSIDERATION DIFFERENT LONG-DISTANCE AND SHORT-DISTANCE PRISMATIC CORRECTIONS

TECHNICAL FIELD

The invention relates to a lens, as well as to a computer-implemented method and a device for calculating or optimizing a lens, wherein the lens may realize different prismatic corrections for long-distance and short-distance.

BACKGROUND

Different prismatic corrections for long-distance and short-distance may be relevant to different applications. Special prisms for short-distance are used, for example, given disorders of binocular vision, for example convergence insufficiency. A convergence insufficiency is a sensory and neuromuscular disorder that prevents a person from correctly seeing an object at short-distance.

In addition to this, given lenses for correction of an anisometropia, in particular given multifocal spectacles and progressive spectacles, there is the problem that a height compensation prism is necessary in order to have no unwanted vertical binocular-prismatic effect appear at the near visual points of the lens pair. According to DIN 5340, an anisometropia is an unequal distant point refraction of the two eyes. If a presbyopic spectacles wearer has the same distance effect on the right and left, given the use of multifocal spectacles at short-distance, the same vertical components of the prismatic effect result on both sides. These are not disruptive to the spectacles wearer since the difference is zero. The prismatic horizontal component does not differ from that given correspondingly centered lenses for long-distance, and thus has no disruptive influence. However, if an anisometropia is present, that leads to different prismatic effects for the two eyes. As soon as the vertical component of the prismatic effect difference exceeds a physiologically compatible limit, problems appear in short-distance binocular vision, since the eye movement at the near reference point cannot simply be replaced by a corresponding head movement, as given single vision lenses. Instead of this, a gaze lowering and thus a decentralized viewing through the lens must actually occur, because only at the near reference point does the lens have the necessary short-distance effect.

There are various conventional possibilities of realizing different prismatic corrections for long-distance and short-distance. One possibility is the manufacture of two separate sets of spectacles for long-distance and short-distance. Another possibility is the realization with a multifocal spectacles. Here, a different prism between long-distance and short-distance can only be achieved via a slab-off grind, meaning that a vertical height compensation prism is introduced onto the mathematically weaker lend. This thereby leads to a visible bend line, and is therefore linked with an image discontinuity at the dividing line. An additional method is to vary the prism continuously along the main line of sight. However, regions with disturbing astigmatism are thereby created in the lens. A progressive vertical prism is described in JP 2000-199877 A. A progressive vertical prism is described in JP H 11 95175 A, JP H 11 295670 A, U.S. Pat. No. 8,042,940 B2, U.S. Pat. No. 8,287,124 B2, and EP 1590700 B1.

SUMMARY

It is an object of the invention to specify a method for calculating and optimizing a lens, in which it is possible to take into consideration different prismatic corrections between long-distance and short-distance and to realize lenses with good compatibility. It is also an object of the present invention to introduce a different prism for long-distance and short-distance in the lens, and nevertheless to keep the astigmatism caused by the prism change small. An additional object of the present invention is to reduce the prismatic differences between the lenses of a lens pair that are caused by anisometropia.

According to a first aspect of the invention, this object is achieved via a computer-implemented method for calculating or optimizing a lens; a method for calculating or optimizing a lens pair; a device for calculating or optimizing a lens or a lens pair; a computer program product having the features; a method for producing a lens or a lens pair; a device for producing a lens or a lens pair; and a lens.

As has already been described in the preceding, different prismatic corrections for long-distance and short-distance may be relevant to different applications. For example, the prescription of internally based prisms (i.e. of horizontal prisms) belongs among the prevalent methods of treatment of convergence insufficiency.

Different prismatic corrections for long-distance and short-distance may also be relevant given the presence of anisometropia. If an anisometropia is present, that thus leads to different prismatic effects for the two eyes at the near reference point or near visual point. As soon as the vertical component of the prismatic effect difference exceeds the physiologically compatible limit, problems appear in short-distance binocular vision. This applies in particular to progressive lenses, since the eye movement at the near reference point cannot simply be replaced by a corresponding head movement, as given single vision lenses; rather, a gaze lowering and thus a decentralized viewing through the lens must actually occur, since only at the near reference point does the lens have the necessary short-distance effect.

The calculation of the arising prismatic load of a binocular system $\Delta P_{RL}$ in cm/m may take place in good approximation according to the following formula:

$$\Delta Pr_{RL} = d \Delta S'_{RL} \tag{1}$$

wherein d is the vertical distance of the near visual points from the optical center points of the ground lenses or the prism reference points given progressive lenses, in cm; and $\Delta S'_{RL}$ is the vertical refractive power difference between the left lens and the right lens, in dpt.

Equation (1) is based on the application of Prentice's Rule to the refractive power difference in the vertical direction.

The tolerance threshold with regard to the appearing vertical prism difference is different between individuals. However, the vertical fusion capability is known to be poor. In the textbook by Diepes and Blendowske, "Optik und Technik der Brille" ["Optics and Engineering of Spectacles"], Optische Fachveraffentlichung GmbH, Heidelberg, 2002, it is indicated as a rule of thumb that countermeasures should be taken as of an anisometropia of 1 dpt, or as of a vertical prism difference of 1 cm/m-1.5 cm/m. Only if the two visual axes (central principal rays) through the right and left lens intersect at the object point in the imaging of an object can the object be viewed in a simple binocular manner. Given anisometropia, the vertical prism difference increases continuously with increasing gaze lowering, and the visual axes at the eyes must therefore be increasingly deflected differently. In order to unburden the fusion mechanisms (binocular motor and sensory fusion), the path of the vertical prisms along the main visual lines of the two lenses must be continuously modified from top to bottom, such that the prismatic difference is markedly reduced.

However, according to the prior art this is not possible without discontinuity in image and/or refractive power. Given surfaces with continuous vertex height in the refractive power between the far reference point $B_F$ and the near reference point $B_N$, in general the astigmatism is predetermined in a fixed manner, or the astigmatic error is kept small along the main line. Due to this specification, the horizontal and vertical increases in the surface (or the change of the prismatic effect) are determined along the main line. The horizontal prism and/or the vertical prism is thus also likewise determined and cannot be changed.

Taking into account the orientation of the eye at various visual locations, although it is possible to realize different prescriptions for long-distance and short-distance (see for example DE 10 2008 057205 A1, DE 10 2011 009473 A1, and EP 2 356 507 B1), it is not possible to correct prismatic imbalances or prismatic differences.

However, according to the invention it has been recognized that, given deviation from these conditions, meaning given deviation from the fixed specification of a refractive power course and/or of an astigmatism course along the main line, it is possible to achieve a variable course of the prismatic effect along the main line. For example, the problem of the excessive binocular prismatic load at short-distance given the presence of an anisometropia may therefore be solved. Specific horizontal prisms may also be introduced at short-distance.

According to aspects of the invention, it is proposed to specifically introduce such a continuously changing horizontal and/or vertical prism along the main line. For example, this may take place "directly" via a superposition with a superposition surface, or "indirectly" via a change in the refractive power and/or the astigmatism along the main line that is incurred with a change to the horizontal and/or vertical prism.

According to a first aspect of the invention, a prism is introduced "indirectly" via a change to the refractive power and/or to the astigmatism. A (computer-implemented) method for calculating or optimizing a lens according to the first aspect includes:

capturing a nominal refractive power and/or a nominal astigmatism in a near reference point of the lens;
determining a correction value of the vertical and/or horizontal prism at the near reference point of the lens;
modifying the nominal refractive power and/or the nominal astigmatism at the near reference point on the basis of the correction value of the vertical and/or horizontal prism of the lens;
calculating or optimizing the lens using the modified nominal refractive power and/or nominal astigmatism at the near reference point.

The method may also include specification of a near reference point and, if applicable, of a far reference point of the lens.

Given a single vision lens, the nominal refractive power at the near reference point may be essentially identical to the refractive power determined by refraction determination, or to the spherical effect or sphere given long-distance vision. Given progressive lenses, the nominal refractive power at the near reference point may be identical to the sum of the nominal refractive power given long-distance vision and the addition. The nominal astigmatism at the near reference point may likewise be essentially identical to the astigmatism determined via refraction determination given long-distance vision. If applicable, a personalized astigmatism at the near reference point may be taken into account which may deviate, in terms of magnitude and/or axis, from the astigmatism for long-distance vision. The nominal refractive power and/or nominal astigmatism may, for example, be determined by an ophthalmologist, optometrist, or automatically.

According to the first aspect of the invention, a refractive power error or an additional addition and/or an astigmatic error is/are deliberately introduced at the near reference point in order to achieve an additional vertical and/or horizontal prism at the near reference point. The calculation or optimization of the lens then takes place using the modified nominal values at the near reference point, preferably so that these values are achieved in the final lens.

An additional vertical prism may, for example, serve for at least the partial correction of an anisometropia of a spectacles wearer. Given the presence of an anisometropia, a vertical prism difference that may be disruptive for binocular vision appears at the near reference point due to the difference in the spherical and/or astigmatic effect of the right lens and left lens. In this instance, the modification of the nominal refractive power and/or of the nominal astigmatism at the near reference point may take place such that the difference of the vertical prisms at the near reference points of the two lenses (vertical prismatic difference), which difference is due to the difference in effect of the two lenses of the spectacles, is at least partially compensated. The prismatic correction value may accordingly be determined using the vertical prismatic difference. An additional horizontal prism may, for example, serve for at least the partial correction of a convergence insufficiency.

The calculation or optimization of the lens may include a calculation or optimization of one of the two surfaces of the lens. The other surface (for example the anterior surface) may be a predetermined or predeterminable surface, for example a simple spherical or rotationally symmetrical aspherical surface. However, it is possible to optimize both surfaces of the lens.

The optimization or calculation of the at least one surface of the lens may take place so that the course of the refractive power along the main line of the surface to be optimized is steady or continuous. A lens may thereby be obtained in which different horizontal and/or vertical prisms may be realized at the far and near reference point with smooth surfaces, without an image discontinuity being created.

The method for calculating or optimizing a lens may accordingly include a determination of a continuous course of the nominal refractive power and/or the nominal astigmatism along a main line of the lens using the modified refractive power and/or nominal astigmatism at the near reference point, wherein the calculation or optimization of the lens takes place using the modified nominal refractive power and/or nominal astigmatism along the main line. The determination of a continuous course of the nominal refractive power and/or the nominal astigmatism may, for example, include a modification of a predetermined course (initial or starting course) of the nominal refractive power and/or of the nominal astigmatism, along a main line of the lens, of a lens or lens design.

The nominal refractive power may, for example, change linearly from top to bottom as a function of the object distance, wherein the modified value at the near reference point is taken into account. The astigmatism may change accordingly, in particular so that a continuous variation of the horizontal and/or vertical prism along the main line may be achieved.

The method for calculating or optimizing a lens may also include a capture of a nominal refractive power and/or a nominal astigmatism at a near reference point of the lens, wherein the continuous course of the nominal refractive power and/or the nominal astigmatism along the main line of the lens is determined using the modified refractive power and/or nominal astigmatism at the near reference point and the nominal refractive power and/or nominal astigmatism at the far reference point.

If the course of the refractive power and/or of the astigmatism along the main line is determined, the side regions of the lens surface may then be calculated with different conventional methods or approaches.

The optimization normally takes place using the minimization of an objective function Z of the form Z(realvalues-nominalvalues). At least one surface of the lens is preferably optimized, wherein the optimization or a minimization of an objective function $Z=F(\vec{x})$:

$$F(\vec{x}) = \sum_{i=1}^{m} \left[ g_{i,\Delta R}(\Delta R_i - \Delta R_{i,nominal})^2 + g_{i,Ast}(Ast_i - Ast_{i,nominal})^2 + \ldots \right]. \quad (2)$$

In the above formula,
$\Delta R_{i,nominal}$ refers to the nominal value of the local refraction error at the i-th evaluation location;
$\Delta R_i$ refers to the actual local refraction error at the i-th evaluation location;
$Ast_{i,nominal}$ refers to the nominal value of the local astigmatic deviation or of the local astigmatic error at the i-th evaluation location;
$Ast_i$ refers to the actual local astigmatic deviation at the i-th evaluation location;
$g_{i,\Delta R}$ refers to the local weighting of the refraction error at the i-th evaluation location;
$g_{i,Ast}$ refers to the local weighting of the astigmatic deviation at the i-th evaluation location.

The refraction error represents the difference of the refractive power of the lens and the nominal refractive power. The astigmatic deviation, or the astigmatic error, represents the difference of the astigmatism of the lens and the nominal astigmatism. These are thereby preferably values in the usage position of the lens, meaning under consideration of the lens-eye system. A weighting of the individual errors (meaning of the refraction error and of the astigmatic error) may also enter into the objective function. In particular, each of the errors may be weighted in a spatially dependent manner via the visual location i.

The modification of the initial values for the nominal refractive power and/or the nominal astigmatism at the near reference point may include the following steps:
calculation of an additional refractive power and/or of an additional astigmatism at the near reference point of the lens, using the correction value of the vertical and/or horizontal prism at the near reference point of the lens; and
addition of the additional refractive power and/or of the additional astigmatism to the nominal refractive power and/or to the nominal astigmatism at the near reference point.

The determination of a correction value of the vertical and/or horizontal prism at the near reference point of the lens may include a determination of a physiologically necessary compensation of a difference between the vertical prism at the near reference point of the lens and the vertical prism at the near reference point of a second lens, wherein the second lens has an effect that differs from the effect of the lens. The second lens may in particular differ from the lens to be optimized with regard to the refractive power or the spherical effect and/or the astigmatism (magnitude and/or axis position).

The determination of a physiologically necessary compensation may, for example, include a determination of a maximum value of the tolerable vertical prism difference at the near reference point between the two lenses (meaning a prism difference that is still physiologically compatible). The vertical prism difference may then be compensated for only until it has reached the value that has been determined by the spectacles wearer to still be compatible.

The correction of the prism difference at the near reference point (in particular the vertical prism difference), which prism difference is due to the different effects of the two lenses, may take place in a monocular or binocular manner. Expressed in a different way, the refractive power and/or astigmatism of only one of the two lenses (of the lens to be optimized) or of both of the lenses may be modified. In the latter instance, the change of the refractive power and/or of the astigmatism at the near reference point, which change is necessary for the at least partial correction of the vertical and/or horizontal prism difference, may be divided up uniformly (50:50) or non-uniformly between the two lenses.

The determination of a physiologically necessary compensation may take place via a measurement of the physiologically necessary compensation and/or a calculation of the physiologically necessary compensation (for example using predetermined empirical values).

To which prism difference an anisometropia for the spectacles wearer leads given short-distance viewing may thus be computed with the aid of Prentice's rule, and if applicable taking into account the geometry of the surface to be calculated or optimized. The determined prismatic difference between right and left eye may be demonstrated in a measurement spectacles by means of prismatic refraction lenses. A check may thus be made as to whether the complete prismatic difference between right and left is perceived by the spectacles wearer to be compatible or incompatible. If the prismatic difference is perceived to be incompatible, the prismatic refraction lens may be reduced in value until the spectacles wearer perceives it to be compatible. A concrete prism value may thus be determined which is compatible with the spectacles wearer. The prismatic difference between right and left eye is preferably compensated only until it has achieved the value that is indicated as compatible by the spectacles wearer. This value may represent the personalized prism compensation that is necessary from a physiological standpoint.

The correction adaptation may be performed in a monocular or binocular manner. In addition to this, the prismatic difference may, as described above, be corrected solely at the cost of an astigmatic error, or only at the cost of a refractive power error. A balanced division between refractive power error and astigmatic error is also possible.

Alternatively, the prism difference determined according to Prentice's Rule may be compared with a predetermined maximum allowable prism difference. If this is exceeded, a correction is necessary.

The prismatic correction value may also be limited to a maximum allowable value in order to achieve a balance between the refractive power error and/or astigmatic error.

The modification of the nominal refractive power and/or the nominal astigmatism at the near reference point may take place:

depending on eyesight or depending on visual acuity, and/or depending on the higher-order aberrations, and/or depending on the astigmatism of the spectacles wearer, and/or depending on the dominant eye.

The captured values for the nominal refractive power and/or the nominal astigmatism at the near reference point may be modified with respect to various aspects. For example, it is possible to make the change to the nominal refractive power or to the addition and/or to the nominal astigmatism at the near reference point dependent on the height (for example, determined by means of refraction determination), astigmatism, and/or the axis position. Too great a change of the magnitude of the nominal astigmatism and/or of the axis position may thus be precluded. The modification of the values for the nominal refractive power and/or for the nominal astigmatism may likewise take place depending on higher-order aberrations of the spectacles wearer. For example, given higher-order aberrations it is thus possible to prefer to accept a change to the nominal refractive power, and to prefer to tolerate a change to the astigmatism given higher astigmatism of the 2nd order. An additional criterion may be which eye of the spectacles wearer is the dominant eye. For example, this eye may be provided with the better correction, meaning with the smaller change of nominal refractive power and/or astigmatism.

The nominal refractive power and/or the nominal astigmatism may be modified so that a continuous change to the horizontal and/or vertical prism along the main line results. The method may also include a determination of a continuous course of the horizontal and/or vertical prism along a main line of the spectacles lens, so that the value of the horizontal and/or vertical prism continually changes from a predetermined value to the value at the near reference point. The calculation or optimization of the lens may then take place using the determined course of the horizontal and/or vertical prism along the main line. The modification of the refractive power and/or of the astigmatism at the near reference point, and if applicable along the main line, and the adaptation of the vertical and/or horizontal prism, may take place iteratively.

It is has also turned out that arbitrary changes to the prism in the horizontal and vertical direction may be achieved in a simple manner via a rotation of a surface strip along the main line about the vertical, or via a rolling of the surface or of the surface strip along the main line.

The determination of a continuous course of the horizontal and/or vertical prism may include the following steps:

determination of a superposition surface or of a superposition surface strip with a main line which corresponds to the main line of the lens, wherein the superposition surface or the superposition strip has the continuous change to the horizontal and/or vertical prism along the main line; and addition of the vertex heights of the superposition surface and the anterior or posterior surface of the lens.

The surface created by the addition of the vertex heights of the superposition surface or superposition surface strip and posterior or anterior surface of the lens may be optimized further (for example together with the lens as a whole).

According to a second aspect of the invention, such a continuously changing horizontal and/or vertical prism is introduced "directly", for example in a single vision or progressive lens. A corresponding (computer-implemented) method for calculating or optimizing a lens may include the following steps:

determining a correction value of the vertical and/or horizontal prism at the near reference point of the lens;

determining a continuous course of the horizontal and/or vertical prism along a main line of the lens, wherein the value of the horizontal and/or vertical prism changes from a predetermined value (for example at the far reference point of the lens) to the value at the near reference point; and calculating or optimizing the lens using the determined course of the horizontal and/or vertical prism along the main line.

As described above, the determination of a continuous course of the horizontal and/or vertical prism may include the following steps:

determining a superposition surface or a superposition surface strip with a main line which corresponds to the main line of the lens, wherein the superposition surface or the superposition strip exhibits the continuous change of the horizontal and/or vertical prism along the main line; and addition of the vertex heights of the superposition surface and/or of the anterior or posterior surface of the lens.

The determination of the correction value and/or the calculation or optimization of the lens may take place as in the first aspect.

However, the change of the prismatic effect or of the vertical and/or horizontal prism is accompanied by a change of the refractive power and of the astigmatism, as is shown in the following. If maintaining the required refractive power change (addition course) between the far reference point (also referred to as $B_F$) and the near reference point (also referred to as $B_N$), the expression:

$$A \approx 2\frac{\Delta P}{l} \tag{3}$$

then approximately applies to the astigmatic error A. In Equation (3), l refers to the progression length or the distance between the far reference point and the near reference point; and $\Delta P$ refers to the change of the prismatic effect.

The same applies with regard to the refractive power error.

The method for calculating or optimizing a lens may accordingly include a changing of the refractive power and/or of the astigmatism at the near reference point, and if applicable along the main line, in order to reduce the refractive power error and/or the astigmatic error. As described above, the changing of the refractive power and/or of the astigmatism, and the changing of the vertical and/or horizontal prism, may take place iteratively.

The methods described above for calculating or optimizing a spectacles lens according to the first and the second aspect may be applied both to single vision lenses and to progressive lenses. The lens to be optimized is preferably a progressive lens.

According to a third aspect of the invention, a method is proposed for calculating or optimizing a lens pair for the correction of an anisometropia of a spectacles wearer. The method includes the following steps:

capture of initial refraction values of each of the two lenses of the lens pair, wherein the initial refraction values include the nominal refractive power and/or the nominal astigmatism at a far reference point and at a near reference point of the lenses;

calculation or optimization of at least one of the two lenses of the lens pair according to the method according to one of the aspects above, wherein the vertical and/or horizontal prism at the near reference point of the lens to be calculated or optimized is determined depending on the difference of the initial refraction values of the two lenses of the pair.

A fourth aspect of the invention relates to a device for calculating or optimizing a lens or a lens pair. The device comprises capture means to capture a nominal refractive power and/or a nominal astigmatism at a near reference point of the lens, or of lenses of a lens pair, and a computation device, wherein the computation device is designed:

to determine a correction value of the vertical and/or horizontal prism at the near reference point of the lens, or of at least one of the lenses of the lens pair;

to modify the nominal refractive power and/or the nominal astigmatism at the near reference point of the lens, or of the at least one lens of the lens pair, using the previously determined correction value of the vertical and/or horizontal prism;

to determine a continuous course of the nominal refractive power and/or of the nominal astigmatism along the main line of the lens using the modified refractive power and/or nominal astigmatism at the near reference point;

to calculate or optimize at least one surface of the lens, or of the least one of the lenses of the lens pair, using the modified nominal refractive power and/or nominal astigmatism at the near reference point and the determined course of the nominal refractive power and/or of the nominal astigmatism along the main line.

The capture means (for example graphical user interfaces, electronic interfaces etc.) may also be part of the computation device. The computation device may comprise suitably configured or programmed computers, specialized hardware, and/or computer networks or computer systems etc. The computation device may be involved in a signal connection with the capture means, and if applicable with corresponding storage systems, by means of suitable interfaces, and in particular may read out and/or modify the data (for example nominal values) stored in the storage systems. The computation device may also comprise a preferably interactive graphical user interface (GUI) which enables a user to input and/or to modify corresponding data (for example nominal refractive power and/or the nominal astigmatism). All calculations preferably take place in real time.

A fifth aspect of the invention relates to a computer program product, as well as to a storage medium with computer program stored thereon, wherein the computer program or the computer program product is designed to implement an exemplary embodiment of the method for calculating or optimizing a lens or a lens pair when loaded and executed on a computer.

A sixth aspect of the invention relates to a method for producing a lens, including:

calculation or optimization of a lens or of a lens pair according to an exemplary embodiment of the method for calculating or optimizing a lens or a lens pair;

manufacturing of the lens or lens pair so calculated or optimized.

In particular, the calculation or optimization of the lens includes a provision of surface data of the lens calculated or optimized according to an example of the method for calculating or optimizing a lens. As has already been described above, one of the two surfaces of the lens (for example the anterior surface) may be a predetermined surface, for example a spherical or rotationally symmetrical aspherical surface. The other surface (for example the posterior surface) is then optimized or calculated.

According to a seventh aspect of the invention, a device for producing a lens is proposed. The device comprises:

a computation device which is designed to calculate or optimize the lens or the lens pair according to a preferred exemplary embodiment of the method for calculating or optimizing a lens or a lens pair;

machining means which are designed to machine the lens or the lens pair to a finished state.

In particular, the device for producing a lens comprises means for providing surface data, which means are designed to provide surface data of the lens calculated or optimized according to an example of the method for calculating or optimizing a lens.

The machining means for machining the lens into a finished state may, for example, comprise CNC machines for direct machining of a blank according to the determined optimization specifications. Alternatively, the lens may be manufactured by means of a casting method. The finished lens preferably has one simple spherical or rotationally symmetrical aspherical surface and one surface (for example aspherical or progressive) optimized according to the design specifications calculated according to the invention as well as according to personalized parameters of the spectacles wearer. The simple spherical or rotationally symmetrical aspherical surface is preferably the anterior surface (meaning the object-side surface) of the lens. However, it is of course possible to arrange the surface optimized according to the calculated design as an anterior surface of the lens.

The device for producing a progressive lens may likewise also comprise capture means to capture personalized data of the spectacles wearer. The capture means may in particular comprise graphical user interfaces.

An eighth aspect of the invention relates to a lens that is designed and configured to realize or achieve different prismatic corrections at long-distance and short-distance.

Lenses are typically designed and configured so that the values predetermined by the prescription or the spherical effect (sphere), the astigmatism (magnitude and axis position), and if applicable the prismatic effect (prism and base) are achieved at predetermined reference or design points. Given progressive lenses, the prescription also includes an addition that normally corresponds to the difference in refractive power between a far reference point and a near reference point.

According to the eighth aspect, it is proposed to generate a modified prismatic effect via a targeted modification of the near-field effect that is predetermined by the prescription, in order to realize different prismatic corrections at long-distance and short-distance in a lens with flat surfaces.

An example of a lens according to the eighth aspect of the invention has a near reference point, wherein the astigmatism (magnitude and/or axis position) and the vertical and/or horizontal prismatic effect at the near reference point respectively deviate by at least 0.5 dpt or 0.5 cm/m from the values of a comparison lens that contains no additional prismatic correction at the near reference point.

The lens has both a certain far-near prism difference and additionally a difference between the far and near astigmatism. The far-near prism difference may be ≥0.5 cm/m, for example. The far-near astigmatism difference, or $|Asti_{far} - Asti_{near}|$, may be ≥0.5 dpt.

An additional example of a lens according to the eighth aspect has a first reference point and a near reference point, wherein:
- the astigmatism at the near reference point deviates by at least 0.5 dpt from the value predetermined by the prescription for the astigmatism at the near reference point, or deviates by at least 0.5 dpt from the astigmatism at the first reference point; and
- the difference of the vertical prismatic effect at the first reference point and the vertical prismatic effect at the near reference point deviates by at least 0.5 cm/m from a value $\Delta Pr_{90}$; and/or
- the difference of the horizontal prismatic effect at the first reference point and the horizontal prismatic effect at the near reference point deviates by at least 0.5 cm/m from a value $\Delta Pr_0$, wherein $$\Delta Pr_{90} = -0.1(-2.5 + 0.05 S_{N90}^2 + (S_{F90} + 0.8 Add_{90})(y_{BN} - y_{BF}) + 0.025 Add_{90}(y_{BN}^2 - y_{NF}^2)); \quad (3a)$$

In the formula (3a):
- $x_{BF}$ refers to the horizontal coordinates of the first reference point;
- $x_{BN}$ refers to the horizontal coordinates of the near reference point;
- $y_{BF}$ refers to the vertical coordinates of the first reference point;
- $y_{BN}$ refers to the vertical coordinates of the near reference point;
- $S_{F90}$ refers to the refractive power in the vertical direction at the first reference point;
- $S_{N90}$ refers to the refractive power in the vertical direction at the near reference point;
- $Add_{90} = S_{N90} - S_{F90}$ refers to the vertical addition;
- $S_{F0}$ refers to the refractive power in the horizontal direction at the first reference point;
- $S_{N0}$ refers to the refractive power in the horizontal direction at the near reference point; and
- $Add_0 = S_{N0} - S_{F0}$ refers to the horizontal addition.

The first reference point may, for example, be the far reference point or the centering point (the centering cross), or the fitting point, of the lens.

According to DIN EN ISO 13666 and DIN 58208, the near reference point is the point on the lens surface (for example the anterior surface or the posterior surface) at which the dioptric (spherical and possibly astigmatic) effect should be achieved for the short-distance portion. The near reference point preferably coincides with the visual point for short-distance vision (short-distance visual point). The far reference point is the point on the lens surface (for example the anterior surface or the posterior surface) at which the dioptric (spherical and astigmatic) effect should be achieved for the long-distance portion. This point preferably coincides with the visual point for long-distance vision (long-distance visual point). The centering point is a point with which the optical center, design reference point, or fitting or centering point should coincide if no prescription prism or thickness reduction prism is present, or if such prisms are neutralized. The centering point is normally identified by means of a cross (centering cross) and serves for the centering of the lens in front of the eyes of the spectacles wearer. The prism reference point is the point on the lens surface (for example the anterior surface or the posterior surface at which the prism should be achieved.

The above definitions may also be accordingly applied to single vision lenses, with the difference that nominally no change of the refractive power takes place in these lenses between far reference point and near reference point (Add=0).

The reference points are normally labeled by means of non-permanent stamp markings. All lenses also normally have two (permanent) micro-engravings or markings using which the position of the remaining reference points on the lens may be unambiguously reconstructed (even if the stamp markings are no longer present). The positions of the reference points may vary depending on the manufacturer). The far reference point may be located at x=0 mm and y=0 mm to +10 mm, for example; the near reference point may be located at x=0 mm to 3 mm (nasally offset) and y=−10 mm to −20 mm, for example; and the centering point may be located at x=0 mm and y=0 to 4 mm, for example. The origin of the coordinate system may, for example, be the middle of the raw, round lens, or may be a point which is situated centrally on the straight line connecting the permanent markings. The horizontal direction is predetermined by the straight line connecting the permanent markings; the vertical direction is orthogonal to this. However, other arrangements of the reference points are also possible, for example given lenses for special applications.

An additional example of a lens according to the eighth aspect has a first reference point and a near reference point, as well as two permanent markings (micro-engravings), wherein:
- the astigmatism at the second reference point deviates by at least 0.5 dpt from the value predetermined by a prescription for the astigmatism at the near reference point, or by at least 0.5 dpt from the astigmatism at the first reference point; and
- the difference of the vertical prismatic effect at the first reference point and the vertical prismatic effect at the near reference point deviates by at least 0.5 cm/m from a value $\Delta Pr_{90}$, and/or
- the difference of the horizontal prismatic effect at the first reference point and the horizontal prismatic effect at the near reference point deviates by at least 0.5 cm/m from a value $\Delta Pr_0$, wherein:

$$\Delta Pr_{90} = 0.2 + 0.7008 S_F + 0.8992 S_N - 0.008 S_N^2 \quad (3b)$$

and $$\Delta Pr_0 = -\frac{S_{F0} + S_{N0}}{8} \quad (3c)$$

and wherein:
- $S_{F90}$ refers to the refractive power in the vertical direction at the first reference point;
- $S_{N90}$ refers to the refractive power in the vertical direction at the near reference point;
- $S_{F0}$ refers to the refractive power in the horizontal direction at the first reference point; and
- $S_{N0}$ refers to the refractive power in the horizontal direction at the near reference point.

The formulas (3b) and (3c) apply in the event that the first reference point is situated in the center between the permanent markings, and the near reference point is offset relative thereto by 16 mm downward and 2.5 mm inward, i.e. nasally, wherein the coordinate system is the coordinate system described above.

The formulas (3a) through (3c) also apply to a plurality of single vision and progressive lenses, preferably to lenses in the refractive power range:

−6.0 dpt≤$S_F$≤+6.0 dpt and Add≤2.50 dpt wherein:
$S_F$ refers to the mean spherical effect at the first reference point (for example at the far reference point);
Add=$S_N$−$S_F$ refers to the addition of the lens; and
$S_N$ refers to the mean spherical effect at near reference point.

According to a further aspect of the invention, a use is proposed of a lens or lens pair produced according to the production method described above, or of a lens according to one of the aspects of the invention described above, in a predetermined average or personalized usage position of the lens in front of the eyes of a defined spectacles wearer, to correct an ametropia of the spectacles wearer.

BRIEF DESCRIPTION OF THE FIGURES

Additional objects, features, and advantages of the present invention become apparent from a detailed description of a preferred embodiment of the present invention, with reference to the drawings.

Shown are:

FIG. 14a-14d an example of a realization of a vertical near prism of 0.75 cm/m (FIGS. 14a and 14b) or 1.75 cm/m (FIGS. 14c and 14d) given a single vision lens;

FIG. 20 an example of a graphical user interface for a method for calculating a vertical and/or horizontal prism in a lens;

FIG. 21 an example of a graphical user interface for a method for calculating or optimizing the correction values of a lens pair to correct an anisometropia of a spectacles wearer.

DETAILED DESCRIPTION

Figure 1:
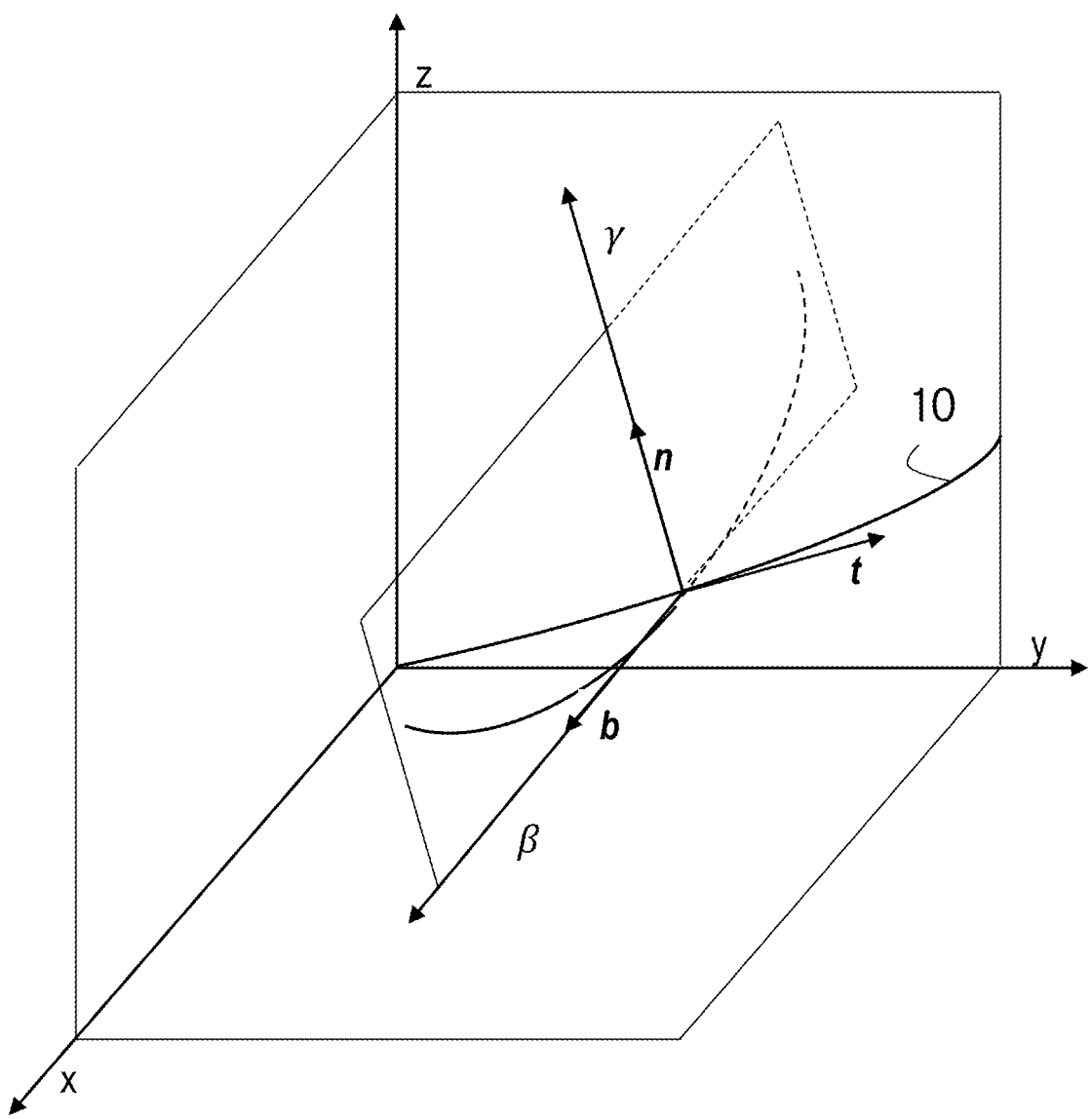
FIG. 1 a presentation of the major normal section and the orthogonal section at a point of the main line of a symmetrical surface.

In all examples, the coordinate system relates to a Cartesian coordinate system whose center point coincides with the geometric center point or the prism reference point of the lens. The vertical direction is the direction directed toward or the center of the Earth, or the direct vertical (orthogonal) to the Earth's surface. The far reference point of the shown lenses is located at +4 mm (=centering point), the near reference point is located at −14 mm, and the prism reference point is located at 0 mm. The eye may be arranged in an average usage position or in a personalized usage position. For example, the usage position may be characterized by the corneal vertex distance, pantoscopic tilt, eye pivot distance, pupil distance, object distance model, and/or other parameters. An average usage position is indicated in DIN 58 208 Part 2, for example. Of course, it is possible to specify all models in other suitable coordinate systems, and to subsequently perform all calculations in the selected coordinate system. Other positions of the reference points are also possible.

What is to be understood by a main line (also referred to as a principal meridian) is a line traveling essentially straight or sinuously, along which line the desired changing of the refractive power of the lens is achieved from long-distance portion to short-distance portion. The main line 10 travels from top to bottom, essentially in the center of the spectacles lens. The main line 10 thus represents a construction line in the coordinate system of the (object-side or eye-side) surface to be optimized, for the description of the nominal values of the lens. The course of the main line 10 of the lens may be chosen so that it at least approximately follows the main sight line.

What is to be understood by a main sight line is the series of penetration points of the principal rays through the respective lens surface upon gazing on a line which is situated in that vertical plane that divides the distance between the two eye pivot points in half (what is known as the cyclopean plane of the eye). The lens surface may be a surface at the object side or the eye side. The position of the main sight line is in particular determined via the selected object distance model.

The principal courses of the lens of each point of the main line 10 are chosen such that the desired change of the refractive power from long-distance portion to short-distance portion is achieved. Assuming this line, the side regions of the lens surface may then be calculated with different methods or approaches. The main line 10 normally connects the far reference point and near reference point of a lens.

As described above, the near reference point is a point on the lens surface (for example the anterior surface or the posterior surface) at which the dioptric effect for the short-distance portion should be achieved. The near reference point preferably coincides with the visual point for short-distance vision (near visual point). The far reference point is the point on the lens surface (for example the anterior surface or the posterior surface) at which the dioptric effect for the long-distance portion should be achieved. This point preferably coincides with the visual point for long-distance vision (far visual point).

The above definitions may also accordingly be applied to single vision lenses, with the difference that nominally no change of the refractive power takes place along the main line 10 in these lenses.

The correlation between prismatic effect and astigmatism and refractive power may generally be described as follows.

Starting from an umbilical line which is situated in a plane that is the plane of symmetry of the surface, in his work, "Über den Flachenastigmatismus bei gewissen symmetrischen Aspharen" [On surface astigmatism given certain symmetrical aspheres"], Optica Acta, 10(3): 223-227 (1963), Minkwitz derived the following correlation between the refraction increase $\partial K/\partial s$ along the umbilical line and the astigmatism increase $\partial Ast/\partial \beta$ orthogonal to the umbilical line:

$$\lim_{\beta \to 0} \frac{\partial Ast}{\partial \beta} = 2 \frac{\partial K}{\partial s}, \quad (4a)$$

wherein s designates the arc length of the course, and $\beta$ designates the distance orthogonal to the course.

In further works, this theorem was also extended to asymmetric surfaces with a sinuous umbilical line. From Minkwitz's theorem, an approximation (see Equation 4b) was derived that describes the correlation between the astigmatism A and the addition Add and the progression length l:

$$\frac{A}{x} = 2\frac{Add}{l} \quad (4b)$$

This approximation has a wide distribution and has been applied in optics.

In Minkwitz, it had already been recommended to depart from the requirement that the main line should be an umbilical line. If there is a departure from the instance of the umbilical line, for reasons of symmetry it already results that the linear term in Equation 4a no longer needs to be 2, but rather must be equal to 0. The astigmatism thus does not increase linearly orthogonal to the main line. This is based on the fact that the linear term may be unequal to 0 only in the special case of the umbilical point, and nevertheless the symmetry requirement must be complied with since the astigmatism changes its direction by 90° (from 45° to 135°) at the main line.

One consequence of the definition of the astigmatism as a magnitude of the principal courses (see Equation (10)) is that the astigmatism cannot be differentiated in the event of an umbilical line as a function of the direction orthogonal to the main line (thus the graph has a "peak"). The underlying variables themselves, meaning the principal courses $k_1$ and $k_2$, are normally continuously differentiable functions. Therefore, the vanishing of the linear term follows directly from the symmetry requirement in the event of the absence of a umbilical line.

However, this does not mean that the astigmatism does not increase laterally relative to the main line in the absence of a umbilical line. Rather, given modern progressive lenses it has been shown that, although Minkwitz's theorem (see Equation 4a) is no longer valid given deviation from the umbilical line, Equation 4b still approximately applies even then.

In the following, generalizations of the "Minkwitz theorem" are proposed for surfaces whose main lines are non-umbilical lines, for asymmetrical surfaces, and for the higher derivatives of astigmatism and refractive power.

Generalization of the "Minkwitz Theorem" Via Expansion to the Higher Derivatives of Astigmatism and Refractive Power in the Event of Symmetrical Surfaces The main line r=r(s) is given as a function of the arc length s. The tangent unit vector t, the principal normal unit vector n, and the binormal unit vector b=t×n span a local Cartesian coordinate system at each point of the course. In the plane that spans the principal normal and tangent unit vector t, n, the main line is situated at r=r(s), whereas the plane which spans the principal normal unit vector and binormal unit vector n, b stands orthogonal to the main line. Since the main line is a flat course, b is constant (see FIG. 1).

A symmetrical surface may be described by Equation 5:

$$F(s,\beta)=r(s)+\beta b+\gamma(s,\beta^2)n(s) \quad (5)$$

If K=K(s) designates the course of the main line, according to Frenet's equations it applies that:

$$\frac{\partial t}{\partial s} = K(s)n \text{ or } \frac{\partial n}{\partial s} = -K(s)t \quad (6)$$

In order that the main line represents an umbilical line, the function $\gamma(s, \beta^2)$ must have the following form:

$$\gamma(s, \beta^2) = \frac{K(s)}{2}\beta^2 + a_4\beta^4 + a_6\beta^6 + \ldots \quad (7)$$

The coefficients $a_4$ and $a_6$ do not depend on the course properties of the main line, but rather may be freely used to model the periphery of the progressive surface. These coefficients thus correspond in the transmitted sense to the B-spline coefficients given the optimization of a progressive surface.

The surface normal N and the coefficients of the fundamental form E, F, G and the second fundamental form L, M, N may be calculated from the first and second partial derivatives of the surface $F(s, \beta)$.

From the coefficients of the fundamental forms, the sought variables of Gaussian course K and the mean course H may be calculated, and from these in turn the astigmatism A and the two principal courses $k_1$, $k_2$ may be calculated. It applies that:

$$K(s, \beta) = k_1 k_2 = \frac{LN - M^2}{EG - F^2} \quad (8)$$

$$H(s, \beta) = \frac{k_1 + k_2}{2} = \frac{EN + GL - 2FM}{2(EG - F^2)} \quad (9)$$

$$A(s, \beta) = k_1 - k_2 = 2\sqrt{H^2 - K} \quad (10)$$

$$k_1(s, \beta) = H + \sqrt{H^2 - K} \quad (11)$$

$$k_2(s, \beta) = H - \sqrt{H^2 - K} \quad (12)$$

For the umbilical line, the expected values then result with:

$$K = K(s)^2, H = K(s), A = 0, k_1 = k_2 = K(s). \quad (13)$$

As a next step, a series expansion of the mean course H and of the expression $H^2 - K$ may be implemented according to the orthogonal coordinate $\beta$. It has turned out that the expression $H^2 - K$ is better suited than the astigmatism directly, since a singularity of the astigmatism at $$\lim_{\beta, A(0) \to 0}$$

may thereby be avoided, and the expression may then also be expanded to a quasi-umbilical line.

Given a 2nd-order strip ($a_4 = a_6 = 0$ in Equation 7), it then results for the mean course H and the astigmatism A that:

$$H(s, \beta) = K(s) + \frac{1}{4}\beta^2(-3K(s)^3 + K''(s)) + \quad (14)$$

$$\frac{1}{16}\beta^4 K(s)(9K(s)^4 - 3K'(s)^2 + K(s)K''(s)) +$$

$$\frac{1}{32}\beta^6(-37K(s)^7 + 19K(s)^3 K'(s)^2 + K''(s)(5K(s)^4 - 3K'(s)^2))$$

$$A(s, \beta) = 2\beta \quad (15)$$

$$\sqrt{K'(s)^2 + \frac{1}{16}\beta^2 \begin{pmatrix} 9K(s)^6 - 16K(s)^2 K'(s)^2 + 6K(s)^3 K''(s) + K''(s)^2 + \\ -18K(s)^8 + 46K(s)^4 K'(s)^2 - 8K'(s)^4 \\ -3K(s)^5 K''(s) - 2K(s)K'(s)^2 K''(s) + K'(s)^2 K''(s)^2 \end{pmatrix}}$$

If Equation 15 is then developed for the variable $\beta$, $A(s, \beta) = 2\beta K'(s)$ thus results for the linear term of the correlation known from Minkwitz's theorem. It is also apparent that even given a 2nd-order strip, the higher terms for both the refractive power and the astigmatism are not equal to zero, and thus for example the astigmatism not only increases linearly (see FIG. 2). Whether the refractive power increases or decreases, the main line depends on the second derivative of the course. If this is positive, the refractive power increases, and in reverse if this is negative, the refractive power decreases (see FIG. 3). By contrast, given astigmatism the quadratic term is always possible independently of the algebraic sign of the second derivative of the course of the main line. This means that the refractive power at the main line should increase as linearly as possible, since otherwise the astigmatism increases more strongly orthogonal to the main line, both due to the greater maximum increase of the refractive power at the main line and due to the second derivative of the refractive power at the main line (see FIGS. 2 and 3).

Figure 2:
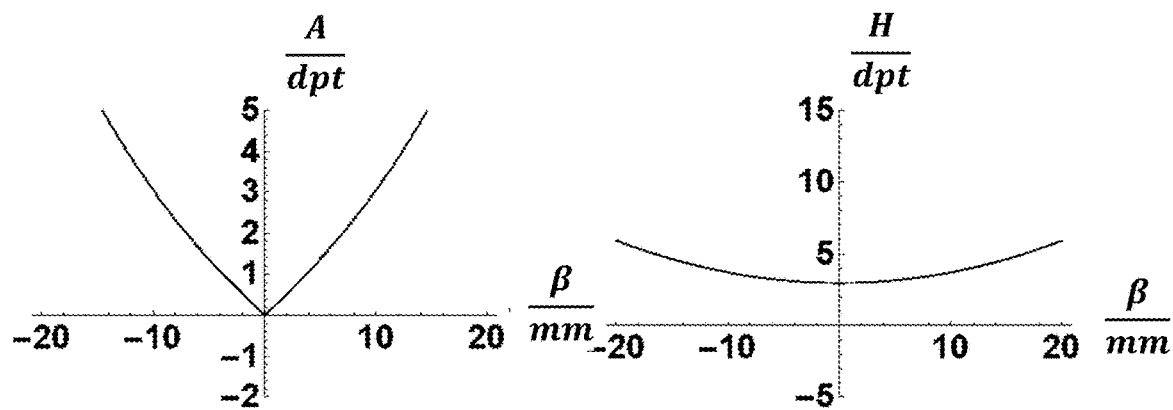
FIG. 2 an example of a course of the mean course H (at right) and of the astigmatism A (at left) in an orthogonal section as a function of the distance β from the main line for a 2nd-order strip with an umbilical line and an increase in course.
Figure 3:
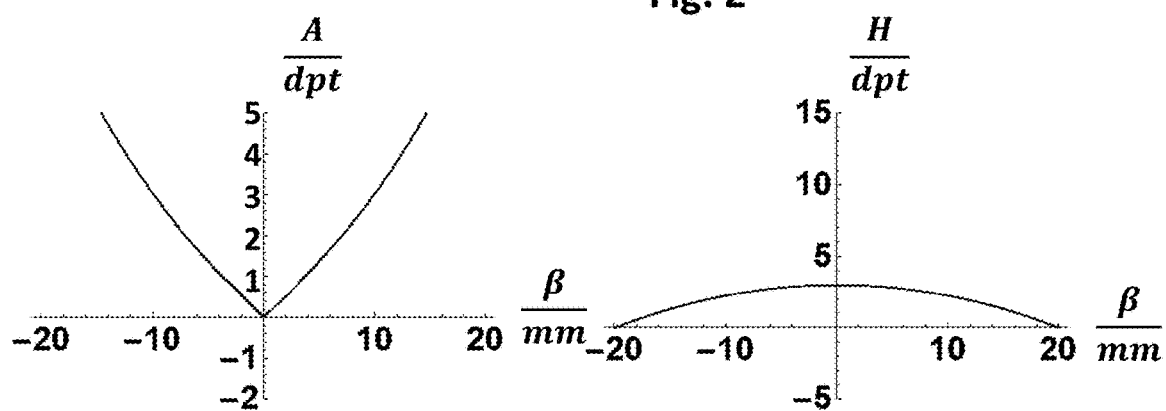
FIG. 3 an example of a course of the mean course H (at right) and of the astigmatism A (at left) in an orthogonal section as a function of the distance β from the main line for a 2nd-order strip with an umbilical line and an increase in course.

FIG. 2 shows the course of the mean course H (at right) and of the astigmatism A (at left) in an orthogonal section as a function of the distance $\beta$ from the main line for a 2nd-order strip having an umbilical line and an increase in course (both positive increase and positive 2nd derivative of the course of the main line). FIG. 3 shows the course of the mean course H (at right) and of the astigmatism (at left) in an orthogonal section as a function of the distance $\beta$ from the main line for a 2nd-order strip having an umbilical line and an increase in course (positive increase but negative 2nd derivative of the course of the main line). The mean course H in dpt and the astigmatism A in dpt are respectively plotted on the ordinate. The distance $\beta$ from the main line is indicated in mm on the abscissa.

Figure 4:
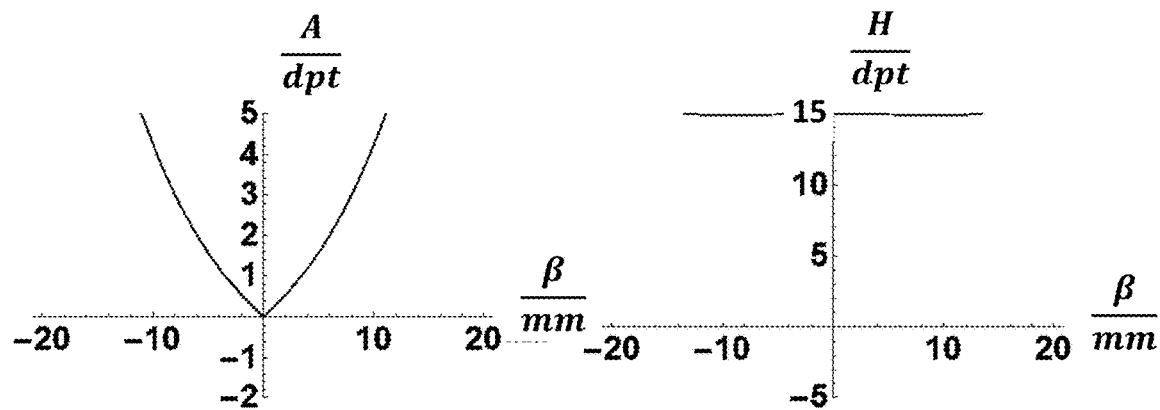
FIG. 4 the course of the mean course H (at right) and of the astigmatism A (at left) in an orthogonal section as a function of the distance β from the main line for a 2nd-order strip with an umbilical line and an increase in course, wherein the course of the base line is very great (base course=15 dpt)

If a very large course on the main line (base course) is chosen which satisfies the condition $$K(s) = \sqrt[3]{\frac{K''(s)}{3}},$$

the (desirable) goal may be achieved that at least the quadratic term in Equation 14 assumes a value of 0, and thus the refractive power orthogonal to the main line is at least approximately constant (see FIG. 4).

Figure 5:
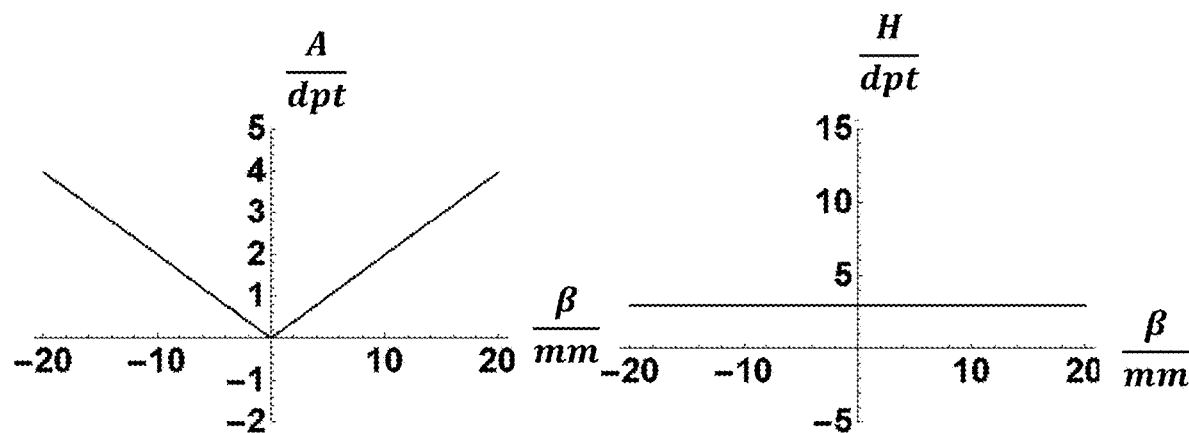
FIG. 5 the course of the mean course H (at right) and of the astigmatism A (at left) in an orthogonal section as a function of the distance β from the main line for a 2nd-order strip with an umbilical line and a linear increase in course.

As is already known, it is not possible to construct a progressive surface in which the refractive power is constant at each orthogonal section. This may only be achieved for exactly one section, if the condition $K(s) = K''(s) = 0$ is satisfied (see Equation 14), thus the course of the main line assumes a value of zero and the course increases linearly. This still approximately applies even if only the course linearly increases and the course itself is small (<5 dpt) (see FIG. 5). As is clear from FIG. 5, the refractive power orthogonal to the main line is nearly constant given a line course increase ($K''(s) = 0$). This means that, although it may be achieved that the refractive power is nearly constant in each orthogonal section, that is only of the course increases linearly, thus the progressive lens has no stabilized regions for far and near.

Figure 6:
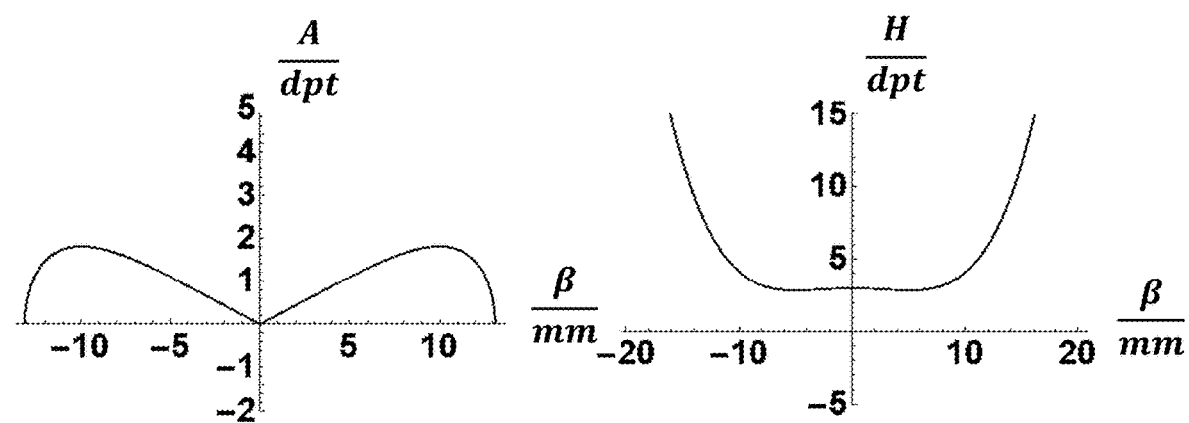
FIG. 6 the course of the mean course H (at right) and of the astigmatism A (at left) in an orthogonal section as a function of the distance β from the main line of a higher-order strip with an umbilical line and an increase in course.

If there is a deviation from the 2nd-order strip, the coefficients $\alpha_4$ and $a_6$ may be used, similar to the B-spline coefficients in the optimization of a surface, in order to markedly reduce the peripheral astigmatism (see FIG. 6).

FIG. 6 shows the course of the mean course H (at right) and of the astigmatism A (at left) in an orthogonal section as a function of the distance $\beta$ from the main line of a higher-order strip (meaning >2nd order). The strip has an umbilical line and a course increase. A marked reduction of the peripheral astigmatism may be achieved via a variation of the coefficients $\alpha_4$ and $a_6$.

In summary, the lateral increase in the astigmatism is determined essentially by "Minkwitz's theorem" given use of an umbilical line and a 2nd-order strip. In order to keep the increase of the astigmatism small, only the derivatives of the course of the main line, in particular the 1st derivative, may be kept small. The peripheral astigmatism may be reduced largely independently of this via an optimization (for example of the coefficients $\alpha_4$ and $a_6$).

Generalization of "Minkwitz's Theorem" to Non-Umbilical Lines Given Symmetrical Surfaces If a deviation is made from the requirement of an umbilical line, Equation 7 must be expanded by the term $\Delta K$:

$$\gamma(s, \beta^2) = \frac{K(s) + \Delta K(s)}{2}\beta^2 + a_4\beta^4 + a_6\beta^6 + \ldots \quad (16)$$

The surface normal N and the coefficients of the first fundamental form E, F, G and of second fundamental form L, M, N may be calculated from the first and second partial derivatives $F(s, \beta)$. The sought variables of Gaussian course K, mean course H may then be calculated from the coefficients of the fundamental forms using Equations 8-12, and from these the astigmatism A and the two principal courses $k_1$, $k_2$ may be calculated in turn.

At the main line, the expected values then result with $$K = K(s)(K(s) + \Delta K(s)), H = K(s) + \frac{\Delta K(s)}{2}, \quad (17)$$

$$A = \Delta K(s), k_1 = K(s), k_2 = K(s) + \Delta K(s)$$

For the special instance of an umbilical line $AK(s)=0$, values result that are known from Equation 13.

Here as well, a series expansion of the mean course H and of the expression $H^2-K$ may be executed according to the orthogonal coordinate $\beta$. Analogous to Equations 14 and 15, it then results for the mean course H and the astigmatism A that:

$$H(s, \beta) = K(s) + \frac{\Delta K(s)}{2} + \quad (18)$$

$$\frac{1}{4}\beta^2\left(-(K(s) + \Delta K(s))(3\Delta K(s)^2 + 7K(s)\Delta K(s) + 3K(s)^2) + \Delta K''(s) + K''(s)\right) + \frac{1}{16}\beta^4 \ldots$$

$$A(s, \beta) = 2 \quad (19)$$

$$\sqrt{\frac{1}{4}\Delta K(s)^2 + \frac{1}{4}\beta^2 \begin{pmatrix} -3\Delta K(s)^4 - 8\Delta K(s)^3 K(s) - 8\Delta K(s)^2 K(s)^2 + \\ 4(K'(s) + \Delta K'(s))^2 - \Delta K(s)(3K(s)^3 + K''(s) + \Delta K''(s)) \end{pmatrix} + \frac{1}{16}\beta^4 \ldots}$$

For the special instance of an umbilical line, meaning that $\Delta K(s)=0$, Equations 18 and 19 transform into Equations 14 and 15.

Figure 7:
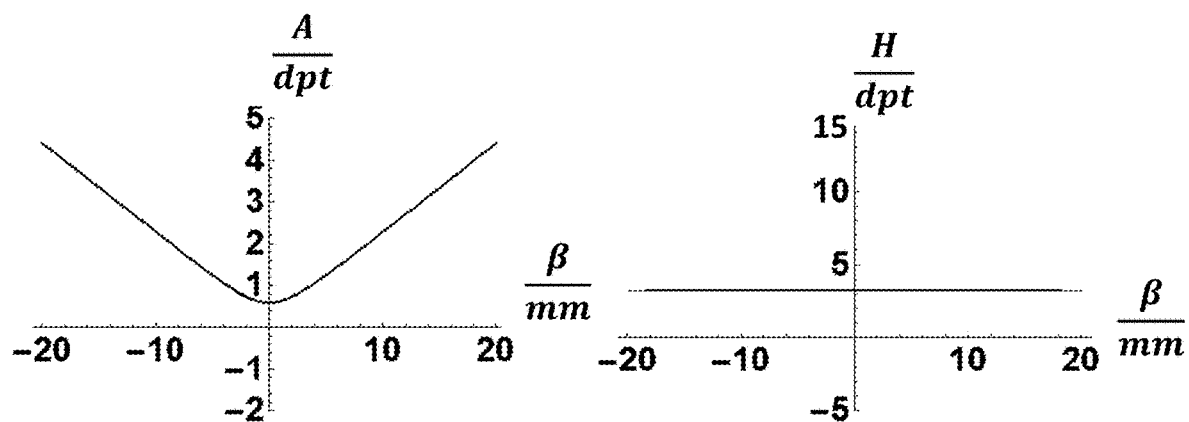
FIG. 7 the course of the mean course H (at right) and of the astigmatism A (at left) in an orthogonal section as a function of the distance β from the main line of a 2nd-order strip with an increase in course and a main line that is not an umbilical line.

It results from Equation 19 that the linear term of the lateral increase of the astigmatism is equal to 0, and no longer follows Minkwitz's theorem. Nevertheless, the astigmatism laterally increases strongly, but now due to the quadratic term (see FIG. 7). FIG. 7 shows the course of the mean course H (at right) and of the astigmatism A (at left) in an orthogonal section as a function of the distance $\beta$ of the main line of a higher-order strip having a course increase, and a main line that is not an umbilical line. As is clear from FIG. 7, the linear term of the lateral increase of the astigmatism no longer follows Minkwitz's theorem, but rather is equal to zero.

It also results from Equation 19 that it is possible to neutralize the dominant factor for the lateral increase of the astigmatism $(K'(s)+\Delta K'(s))$ in that the increase of the astigmatism $\Delta K'(s)$ along the main line is twice as great as the increase in course $K'(s)$ along the main line itself. In this instance, the lateral increase is approximately equal to zero (see FIG. 8). In the event that the course and the astigmatism at the main line are equal to zero ($\Delta K(s)=K(s)=0$), and the increase of the astigmatism along the main line has the opposite value of that of the course increase along the main line, i.e. ($\Delta K'(s)=-K'(s)$ and $\Delta K''(s)=-K''(s)$), this is even possible exactly.

Figure 8:
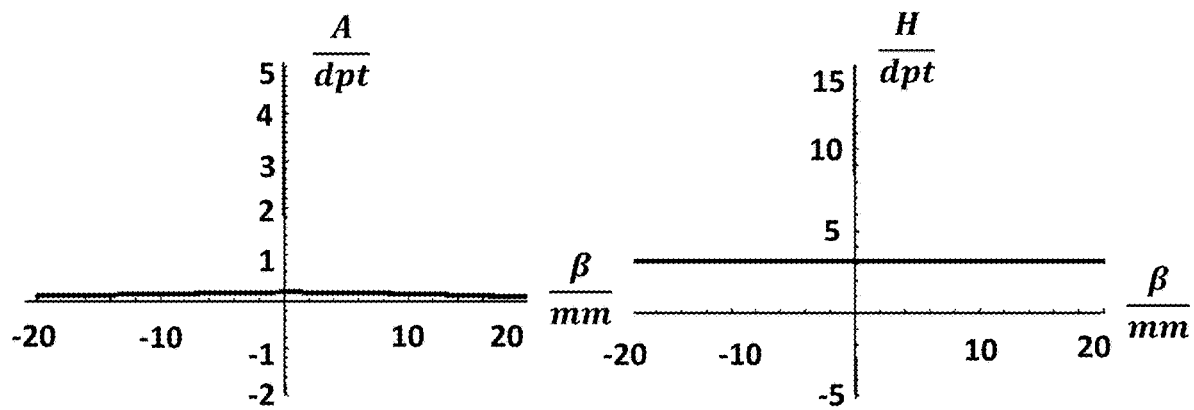
FIG. 8 the course of the mean course H (at right) and of the astigmatism A (at left) in an orthogonal section as a function of the distance β from the main line of a 2nd-order strip with an increase in course and astigmatism, and a main line that is not an umbilical line.

FIG. 8 shows the course of the mean course H (at right) and of the astigmatism A (at left) in an orthogonal section as a function of the distance $\beta$ from the main line when the increase of the astigmatism $\Delta K'(s)$ along the main line is twice as great as the course increase $K'(s)$ along the main line itself. As is clear from FIG. 8, the lateral increase of the astigmatism is approximately zero, even for small values of $\Delta K(s)$ and $K(s)$ as is typical given progressive surfaces.

Such a surface (without increase of the lateral astigmatism) is characterized in that only the course along the main line increases, and the course orthogonal thereto remains constant. This in turn means that, along the main line, the astigmatism increases twice as strongly as the mean refractive power (along the main line) It thus appears as if a more general rule would exist than Minkwitz's theorem, which describes the correlation between course increase along the main line and astigmatism orthogonal to the main line. For example, a cylinder surface at which each horizontal section has a straight line (or at least a course with constant course) and the vertical section rolls up in a spiral shape represents such a surface.

In summary, given deviations from the requirement of a umbilical line, it is possible to design the surface so that the lateral increase of the astigmatism may be markedly reduced. However, for this the astigmatism along the main line must increase by approximately the same order of magnitude. An aberration-free progressive lens also cannot be realized with this. However, based on this realization it is possible, given distance-weighted progressive lenses, to reduce the peripheral astigmatism in preferred regions at the cost of the astigmatism at the main line in less important regions, for example.

Generalization of "Minkwitz's Theorem" to Asymmetrical Surfaces with Prismatic Effect If there is a deviation from symmetry, and thus a prismatic effect is also allowed, Equation 16 may be expanded as follows:

$$\gamma(s, \beta^2) = a_1(s)\beta + \frac{K(s) + \Delta K(s)}{2}\beta^2 + a_3(s)\beta^3 + a_4(s)\beta^4 + a_5(s)\beta^5 + \ldots \quad (20)$$

The ratio $$\frac{a_1(s)}{\sqrt{1 + a_1(s)^2}}$$

describes the horizontal prism.

The surface normal N and the coefficients of the first fundamental form E, F, G and of the second fundamental form L, M, N may be calculated from the first and second partial derivatives F(s, β). The sought variables of Gaussian course K, mean course H may then be calculated from the coefficients of the fundamental forms using Equations 8-12, and from these the astigmatism A may be calculated in turn. It then results at the main line that:

$$K = \frac{K(s)(K(s) + \Delta K(s)) - a_1'(s)}{(1 + a_1(s)^2)^2} \qquad (21)$$

$$H = \frac{K(s)(2 + a_1(s)^2) + \Delta K(s)}{2(1 + a_1(s)^2)^{\frac{3}{2}}} \qquad (22)$$

$$A = \sqrt{\frac{(\Delta K(s) - a_1(s)^2 K(s))^2 + 4(1 + a_1(s)^2)a_1'(s)^2}{(1 + a_1(s)^2)^3}} \qquad (23)$$

From Equation 23, it is clear that the astigmatism is inevitably greater than zero (A>0) if the derivative of the horizontal prism $a'_1(s)$ is not equal to zero. This means that, if the prism changes—for example because different prismatic effects should be realized at long-distance and short-distance—an astigmatism automatically results at the main line.

If the special instance is considered in which only a predetermined constant prism $a_1(s)$ should be achieved, such that $a'_1(s)=0$, an astigmatism of 0 may again be achieved via suitable selection of the course difference (between the course of the main line and orthogonal thereto). In this instance, it is possible to adjust the prism and the astigmatism (including 0) independently of one another.

As was already described, however, an astigmatism inevitably results if the prism should be changed ($a'_1(s) \neq 0$). The astigmatic error is minimal when the prism itself is $\alpha_1(s)=0$ and the course difference is also $\Delta K(s)=0$. It then results for the astigmatism that $$A = 2a'_1(s) \qquad (24)$$

For the cross cylinder components (also referred to as a Jackson cylinder) of astigmatism A, it then results that $$J_0 = 0, J_{45} = a'_1(s) \qquad (25)$$

This means that the axis position must be 45° or 135°. In these instances, the main line is situated precisely in the middle between the principal sections. The course normal (the main line) and the surface normal of the cylindrical surface (along the main line) thus drift maximally away from one another, so that the greatest possible prismatic change results.

Equation 25 is also still a good approximation when the prism is not equal to 0, since $\alpha_1(s)^2$ is always very small in comparison to the other variables. $\alpha_1(s)^2 = 0.01$ thus corresponds to a prismatic effect of 10 cm/m.

The change of the prism $a'_1(s)$ has no influence on the mean refractive power H (see Equation 22).

Estimation of the Order of Magnitude of the Astigmatism

If it is assumed that the prismatic effect should change linearly by the value ΔP over the progression length l, for the astigmatism A it then results at the main line that $$A \approx 2\frac{\Delta P}{l} \qquad (26)$$

Figure 9:
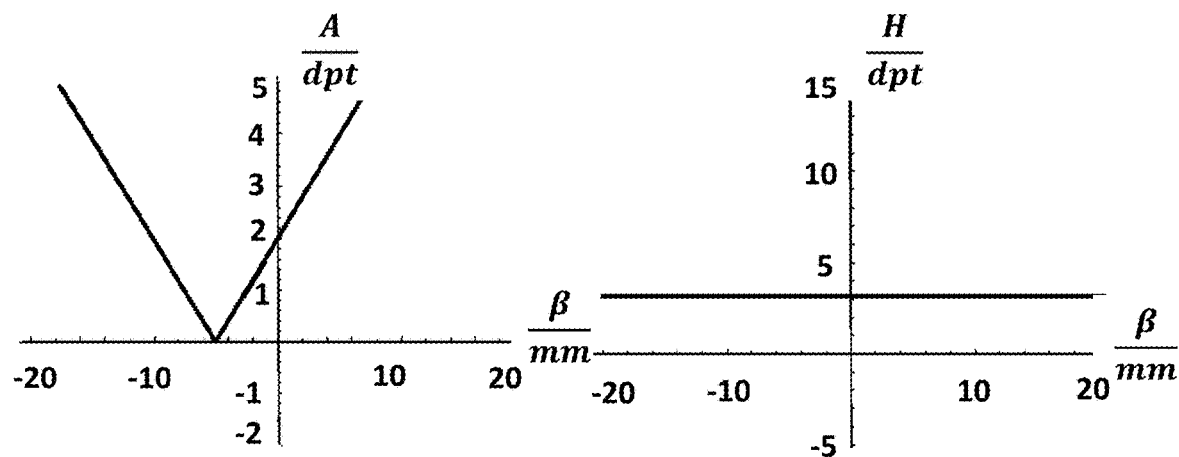
FIG. 9 the course of the mean course H (at right) and of the astigmatism A (at left) in an orthogonal section as a function of the distance β from the main line given a linear increase of the prismatic effect along the main line.

For example, if the progression length l=10 mm and the prismatic difference is ΔP=3 $^{cm}$/m, an astigmatic error A of 6 dpt then results (see FIG. 9).

FIG. 9 shows the course of the mean course H (at right) and of the astigmatism A (at left) in an orthogonal step as a function of the distance β from the main line given a linear increase of the prismatic effect along the main line. If the prismatic effect changes linearly by the value ΔP=1 cm/m over the progression length l=10 mm, A=2 dpt then results for the astigmatism at the main line. The specification of the change of the prismatic effect has no influence on the mean refractive power.

Given specification of a change of the prismatic effect, for example between long-distance and short-distance, an astigmatic error inevitably results that is twice as great as the change of the prismatic effect.

Introduction of a Horizontal Prism

A variation of the horizontal prism may be generated by, for example, a rotation of a surface strip or of a surface defined by the surface strip about the vertical. In particular, an arbitrary variation of the horizontal prism may be generated by means of rotation of a simple superposition surface on the posterior surface (and/or on the anterior surface) of a lens. The horizontal sections of this surface are straight lines whose horizontal slope $$\frac{dz}{dx} = \tan\alpha$$

is calculated from the prism specification $pr_N$ or pr.

Figure 10:
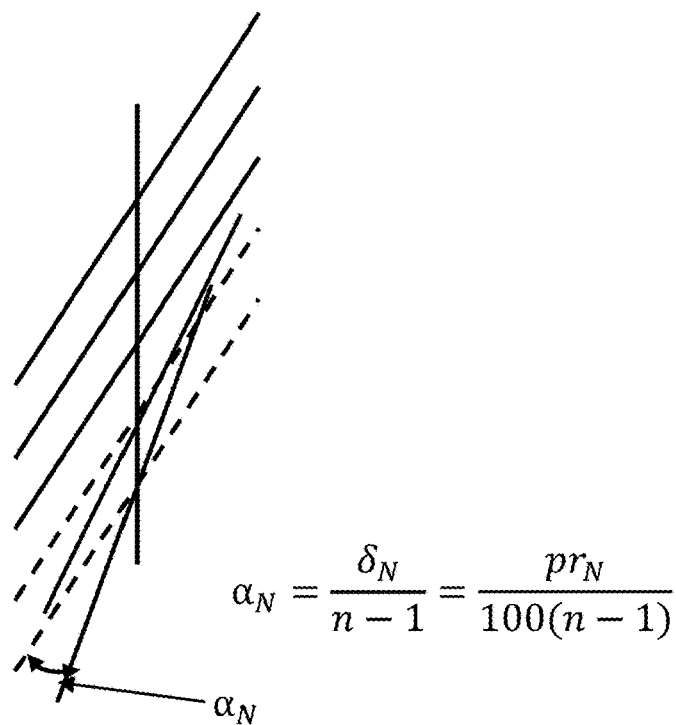
FIG. 10 an example of a rotation of a surface to generate a horizontal prism.

A y-dependent horizontal prism may be generated with, for example, a superposition surface with the aid of a rotation of the surface by a horizontal rotation angle (wedge angle) $\alpha = \alpha(y)$, as shown in FIG. 10. It thereby applies that:

$$pr = 100\tan\delta \approx 100\delta \Rightarrow \delta = \frac{pr}{100} \qquad (27)$$

In formula (27):
pr refers to the prismatic effect, here the horizontal prism
δ refers to the deflection angle, angle between object-side and eye-side principal ray $$\alpha = \frac{\delta}{n-1} = \frac{pr}{100(n-1)} \qquad (28)$$

a refers to the refractive angle, meaning the angle between the two surfaces
n refers to the refractive index of the glass material.

Given a required change of the horizontal prism at short-distance, $pr_N$, with (28) the rotation angle at short-distance results as $$\alpha_S = \frac{pr_N}{100(n-1)}.$$

If the horizontal section of the rotating strip is described with simple straight lines, the vertex height in a horizontal section is then simply calculated with the straight line equation:

$$z(x) = \tan ax \approx ax \qquad (29)$$

and the superposition surface is formulated as $$z(y, x) = \alpha(y)x = f(y)\alpha_y x = f(y)\frac{pr_N}{100(n-1)}x \quad (30)$$

A simple transition of the rotation angle α(y) from $\alpha_F \approx 0$ at long-distance to $\alpha_N$ at short-distance can be realized by means of one-dimensional functions with two asymptotes, for example of the arctan function:

$$f(y) = 0.5 - \frac{\arctan(a(y - y_0))}{\pi}, \quad (31)$$

wherein:

$0 \leq f(y) \leq 1$;

$y_0$ designates the center, for example $y_0 = 0.5(y_{BF} + y_{BN})$, wherein $y_{BF}$ designates the vertical coordinate of the far reference point and $y_{BN}$ designates the vertical coordinate of the near reference point;

a controls how quickly the transition from $\alpha_F$ to $\alpha_N$ takes place, wherein the smaller the α, the slower the transition.

Examples of values are $y_0 = -5$ and $\alpha = 0.2$.

Figure 11A:
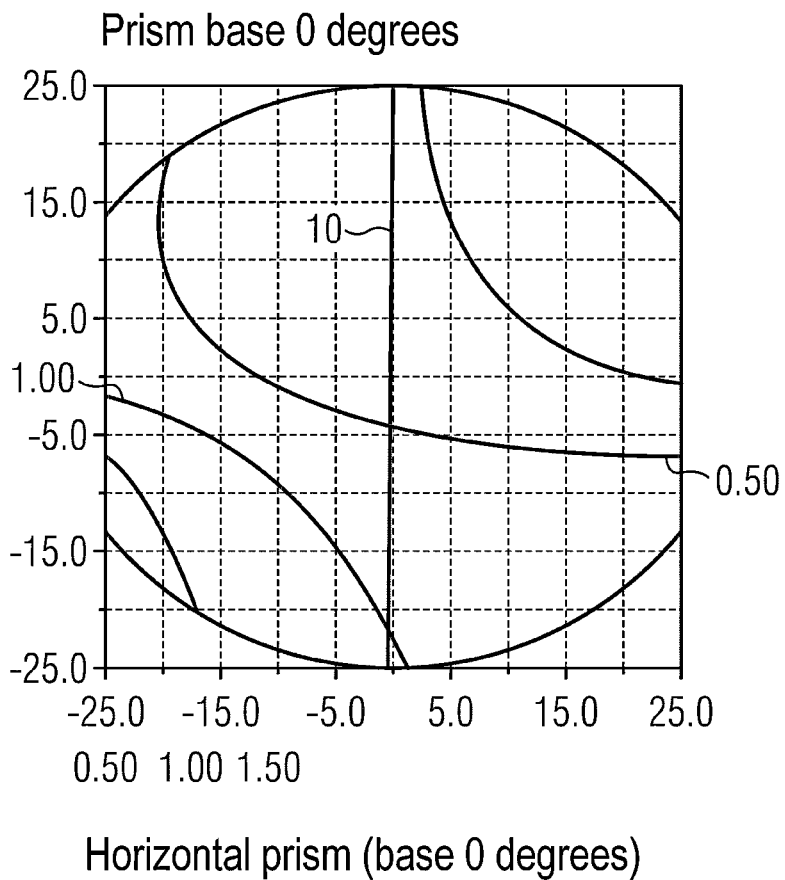
FIG. 11a-11d an example of a realization of a horizontal near prism of 1 cm/m (FIGS. 11a and 11b) or 2 cm/m (FIGS. 11c and 11d) given a single vision lens.
Figure 11A:
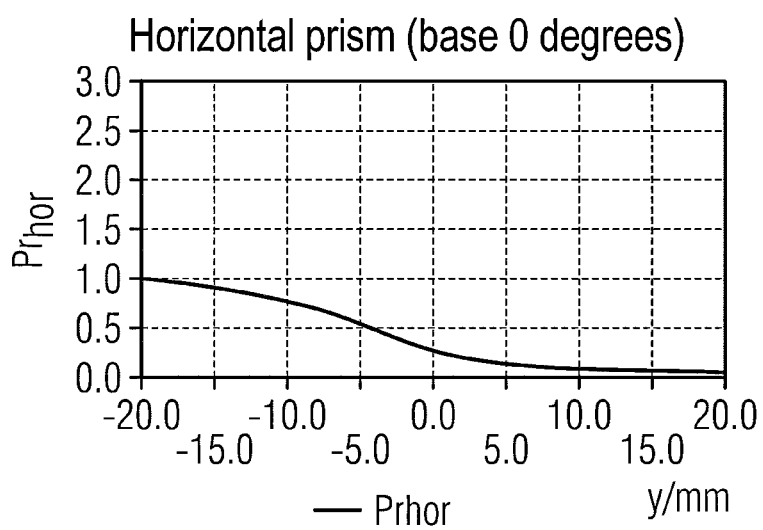
Figure 11B:
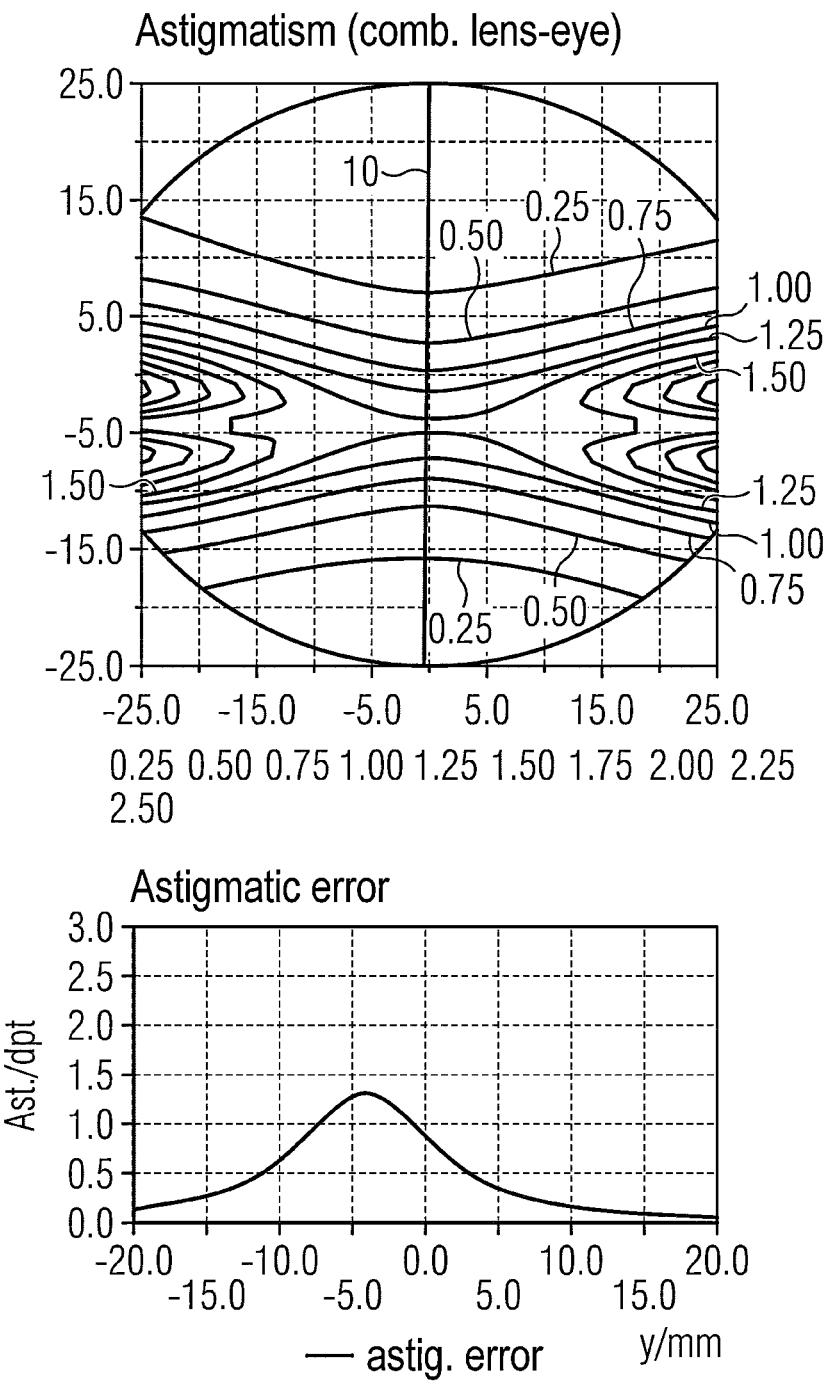
Figure 11C:
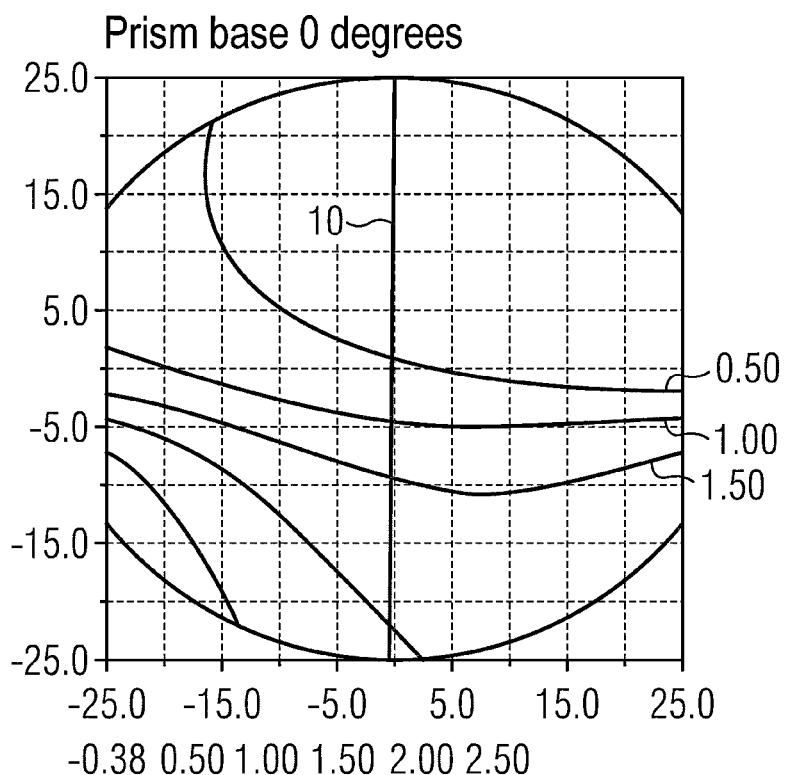
Figure 11C:
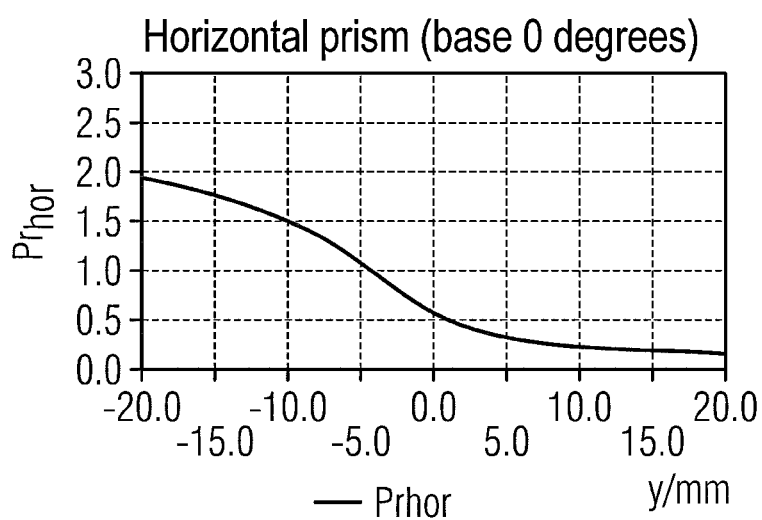
Figure 11D:
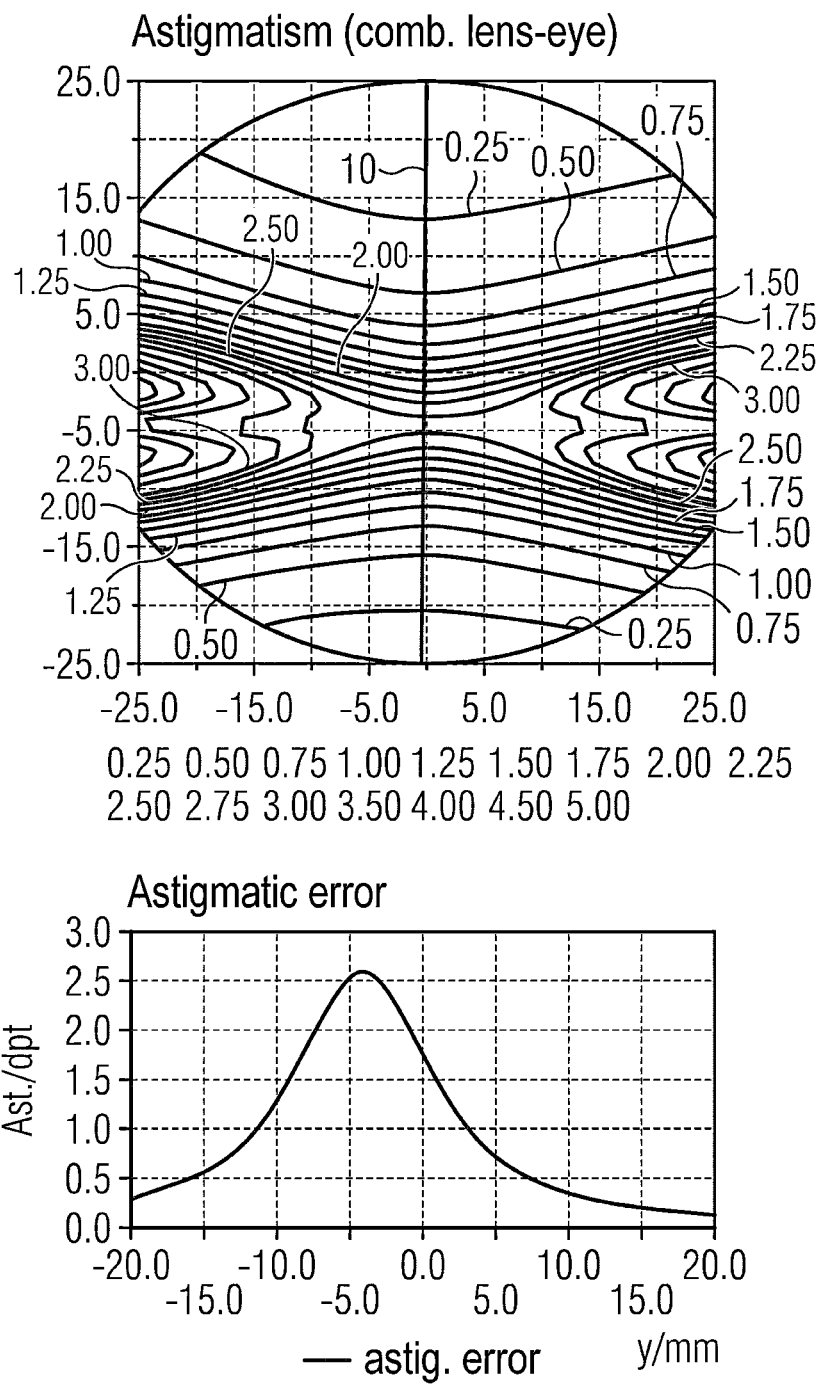

FIG. 11a-11d show an example of a realization of a short-distance prism base internal, or base 0° (meaning a horizontal prism), of 1 cm/m (FIGS. 11a and 11b) or 2 cm/m (FIGS. 11c and 11d) given a single vision lens. FIGS. 11a and 11c respectively show the isolines of the horizontal prism (above) and the course of the horizontal prism along the y-axis (below). FIGS. 11b and 11d respectively show the isolines of the astigmatism in the usage position of the lens (above) and the course of the astigmatism in the usage position of the lens along the y-axis (below). A relatively slow rising height of the horizontal prism results along the y-axis, which leads to a maximum astigmatism of 1.25 dpt (FIGS. 11a and 11b) or 2.50 dpt (FIGS. 11c and 11d). As described above, the horizontal prism is generated with a superposition surface with the aid of a rotation of the surface by a horizontal rotation angle (wedge angle).

Figure 12A:
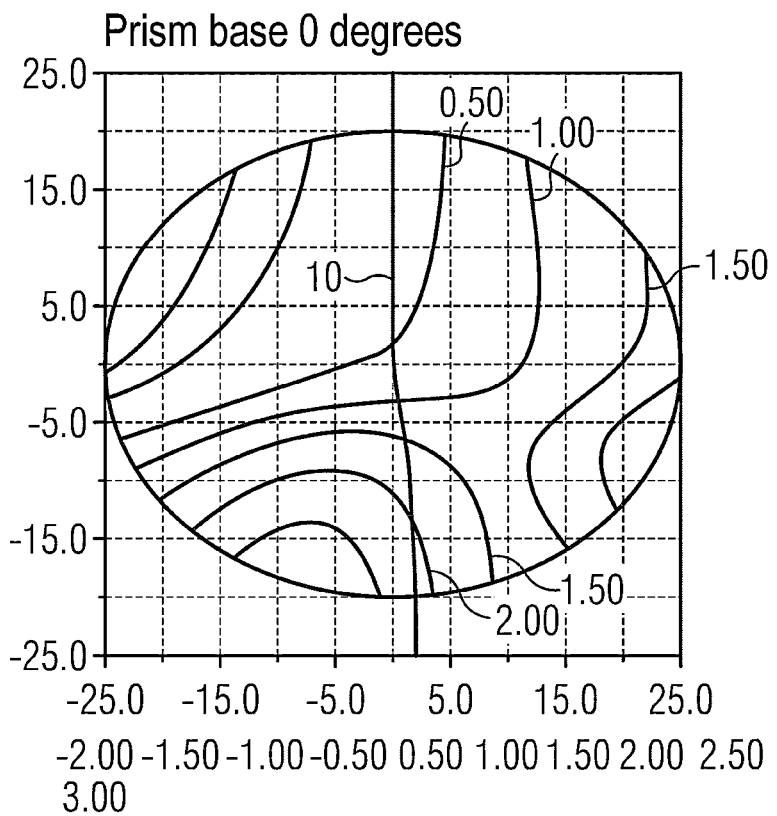
FIG. 12a-12b an example of a realization of a horizontal near prism of 2 cm/m given a progressive lens.
Figure 12A:
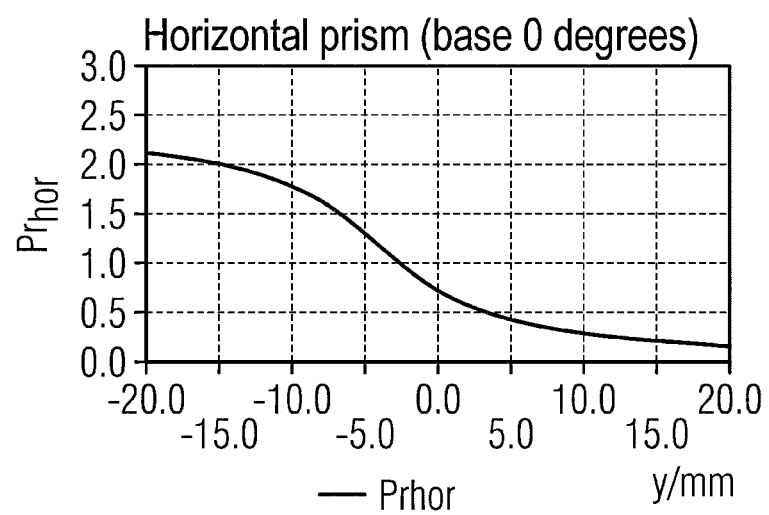
Figure 12B:
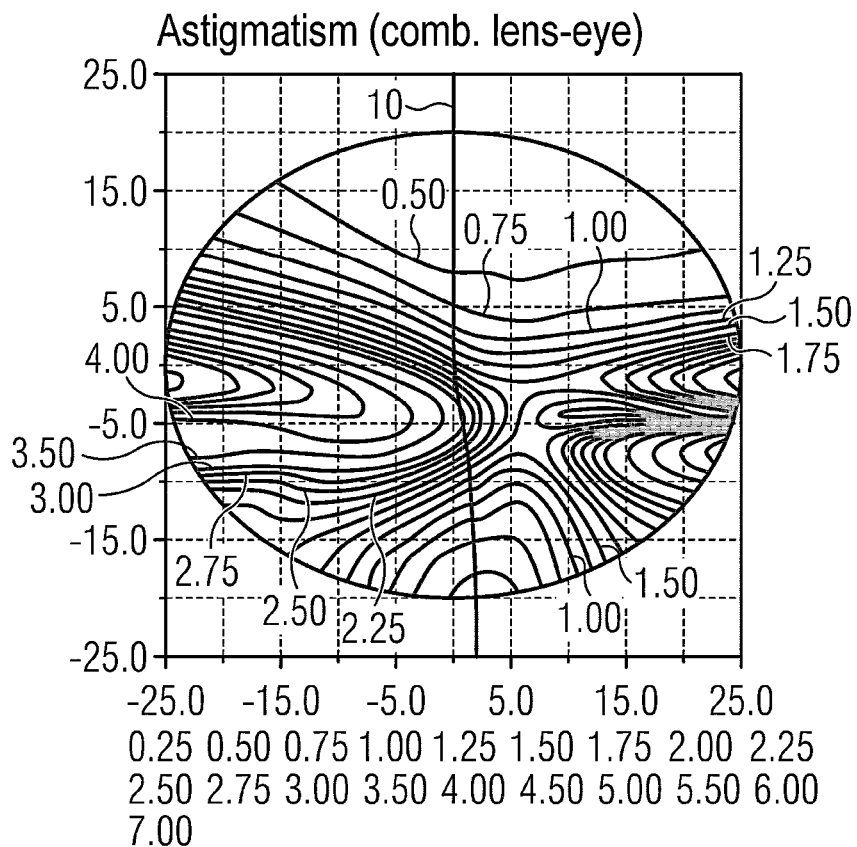
Figure 12B:
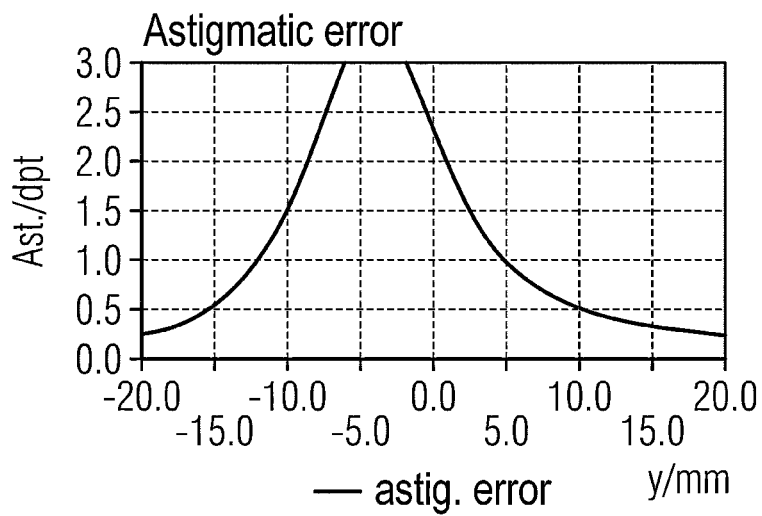
Figure 12C:
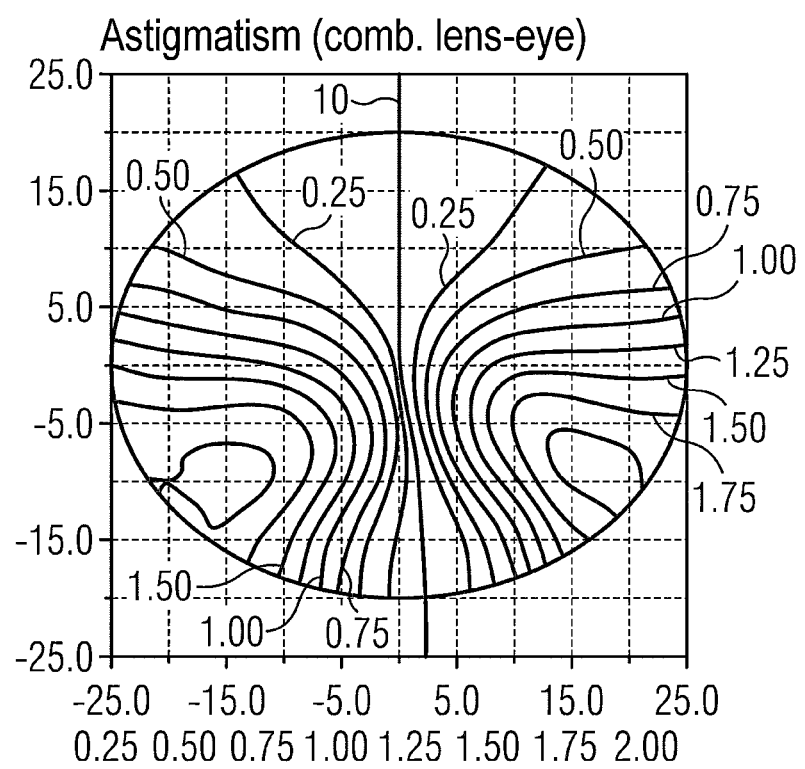
FIG. 12c a conventional comparison lens.

FIG. 12a-12b show an example of a realization of a short-distance prism base internal of 2 cm/m given a progressive lens with a spherical effect (sphere) at the far reference point Sph=−1.0 dpt, a nominal astigmatism at the far reference point Ast=0.0 dpt, and an addition Add=2.0 dpt. FIG. 12a shows the isolines of the horizontal prism or of the prism basis 0° (above), and the course of the horizontal prism along the y-axis (below). FIG. 12b shows the isolines of the astigmatism in the usage position of the lens (above) and the course of the astigmatism in the usage position of the lens along the y-axis (below). FIG. 12c shows the isolines of the astigmatism in the usage position of a comparison lens without short-distance prism. The comparison lens has the same parameters (Sph, Add) as the lens shown in FIG. 12a-12b.

Introduction of a Vertical Prism

Figure 13:
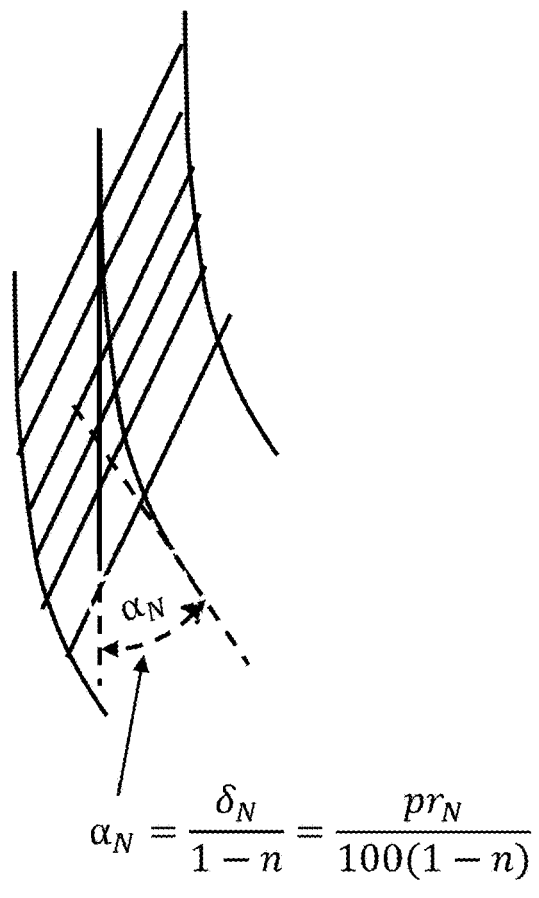
FIG. 13 an example of a change in the increase of the vertical section of a superposition surface to generate a vertical prism.

A vertical prism may be generated or introduced via a rolling of the posterior and/or anterior surface of the lens. A y-dependent vertical prism may be generated via a superposition surface in that the slope of the vertical section is modified, as shown in FIG. 13. In the example shown in FIG. 13, the horizontal section remains unchanged. However, it is possible to vary both the vertical prism and the horizontal prism, or both the vertical section and the horizontal section.

The change of the slope of the vertical section and the superposition function may be determined as follows from the prism specification principal $pr_N$ or pr:

$$pr_N = 100 \tan \delta_N \approx 100\, \delta_N \Rightarrow \delta_N = \frac{pr_N}{100} \quad (32)$$

The slope of the vertical section is predetermined:

Long-distance slope: $\tan \alpha_F = 0$ (33a)

Short-distance slope:

$$\tan \alpha_N = \frac{pr_N}{100(1-n)} \quad (33b)$$

$$\tan \alpha = \frac{dz}{dy} = \frac{b}{\pi}\arctan(a(y - y_0)) - \frac{b}{2} \quad (34)$$

The integration yields the vertex height z(y):

$$z(y) = \frac{b}{2\pi(y')}\left(-2ay'\arctan(ay') + \ln(1 + a^2 y'^2) + a\pi y'\right) \quad (35)$$

with $y' = y - y_0$, wherein $y_0$ and a are predetermined, and b is calculated from $pr_N$ according to Equations 34 and 33b.

An arbitrary variation of the vertical prism may thus also be generated by means of a simple superposition function on the posterior surface or the anterior surface of the lens.

Figure 14A:
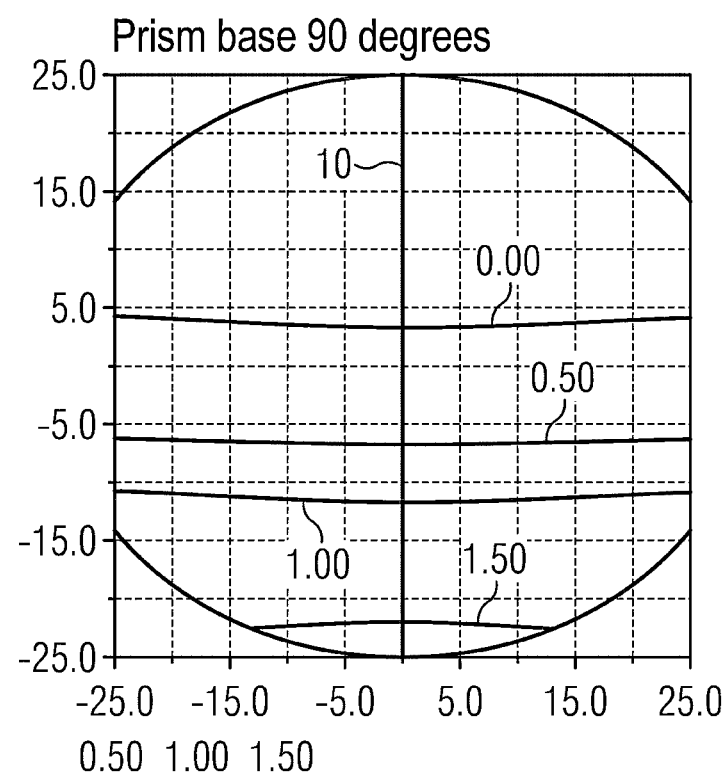
Figure 14A:
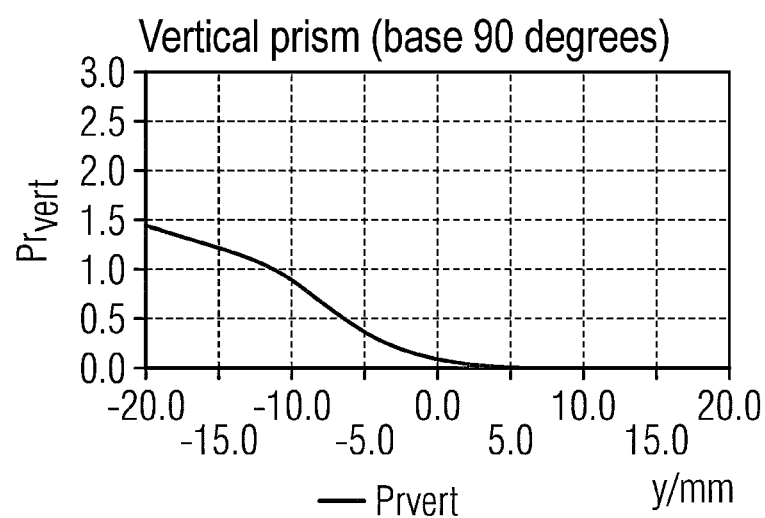
Figure 14B:
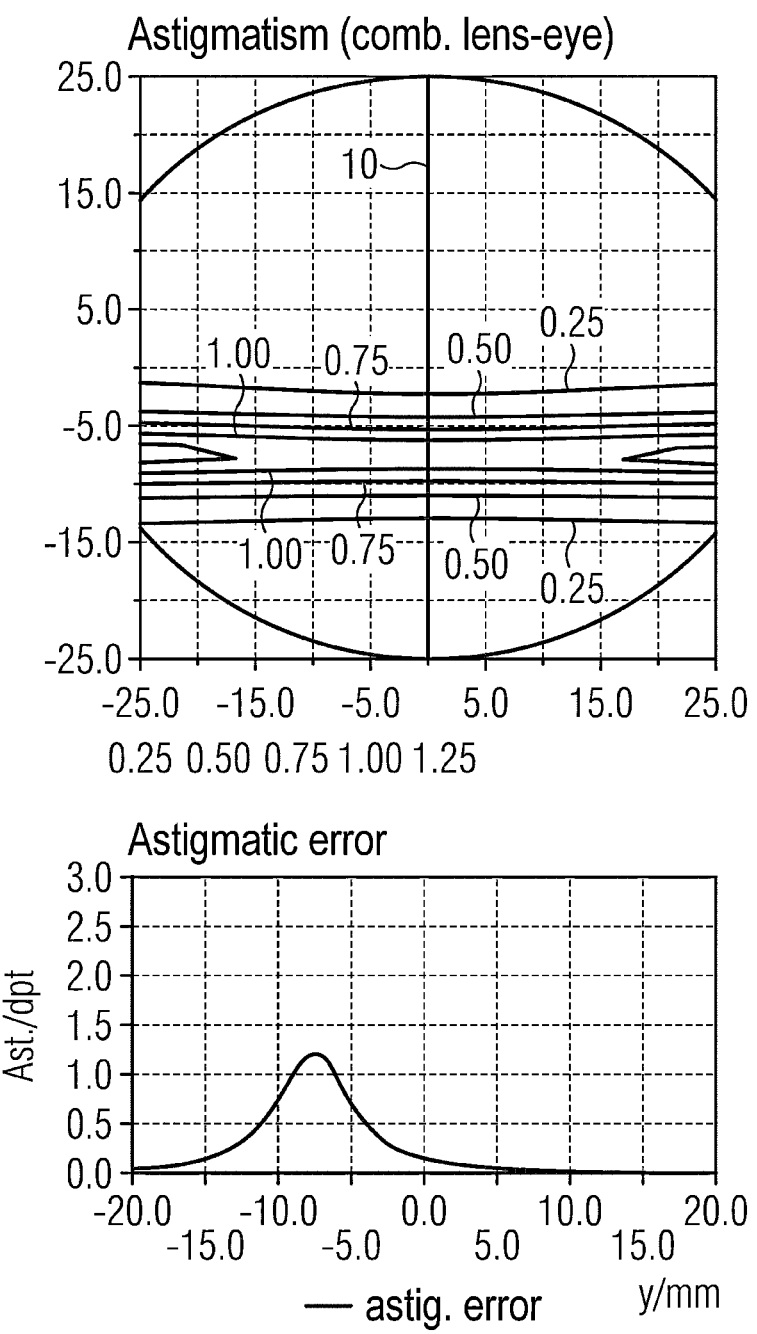
Figure 14C:
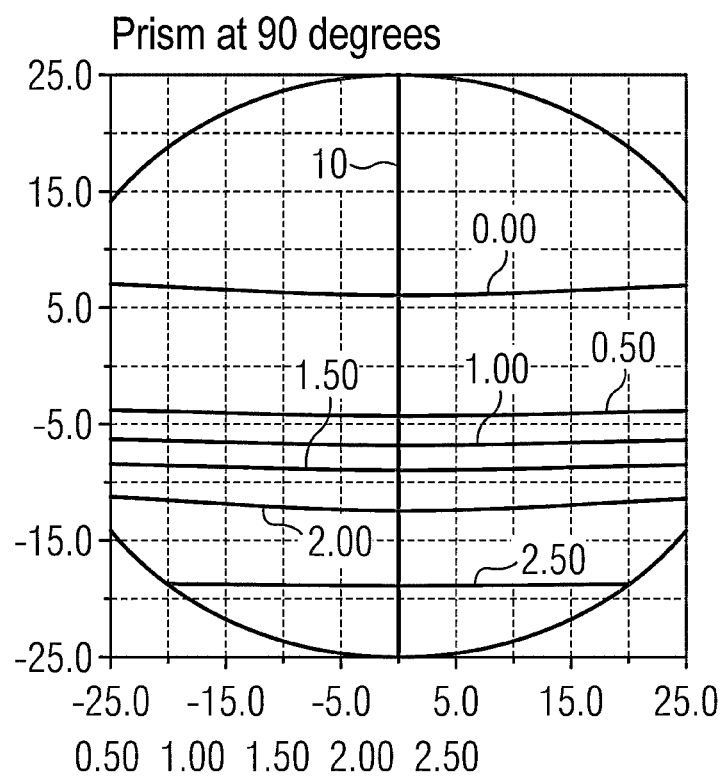
Figure 14C:
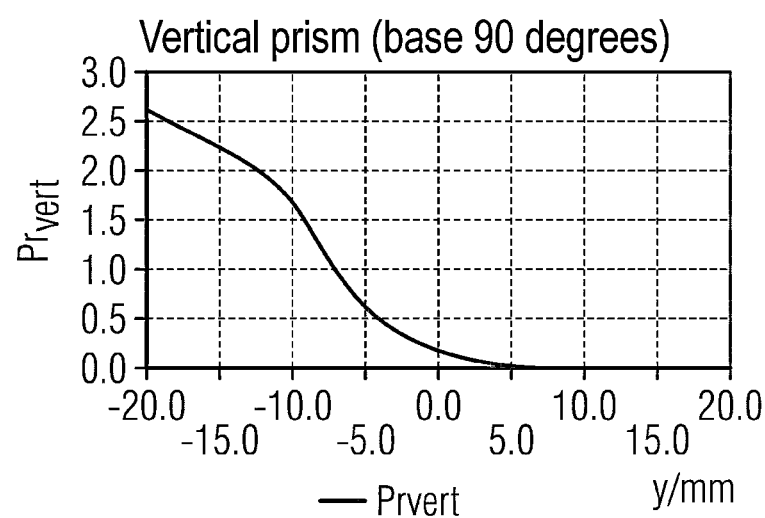

FIG. 14a-14d show an example of a realization of a short-distance prism base 90° (i.e. of a vertical prism) of 0.75 cm/m (FIGS. 14a and 14b) or 1.75 cm/m (FIGS. 14c and 14d) given a single vision lens. FIGS. 14a and 14c respectively show the isolines of the vertical prism or of the prism base 90° (above), and the course of the vertical prism along the y-axis (below). FIGS. 14b and 14d respectively show the isolines of the astigmatism in the usage position of the lens (above) and the course of the astigmatism in the usage position of the lens along the y-axis (below). Via the introduction of the vertical prism, a maximum astigmatism $Ast_{max}$ of 1.2 dpt (FIG. 14b) or 2.5 dpt (FIG. 14d) results in the middle of the progression zone given an error-free long-distance region and short-distance region. The ground glass respectively already has a vertical prism of $$0.25 \, \frac{cm}{m}$$

at the near reference point $B_N$.

Figure 15A:
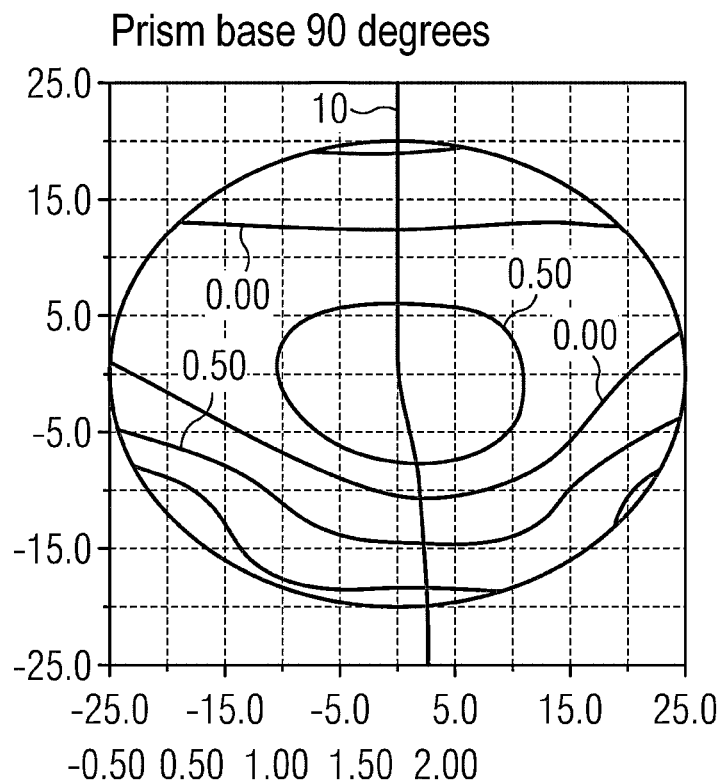
FIG. 15a-15c an example of a realization of a vertical near prism of 1 cm/m given a progressive lens.
Figure 15A:
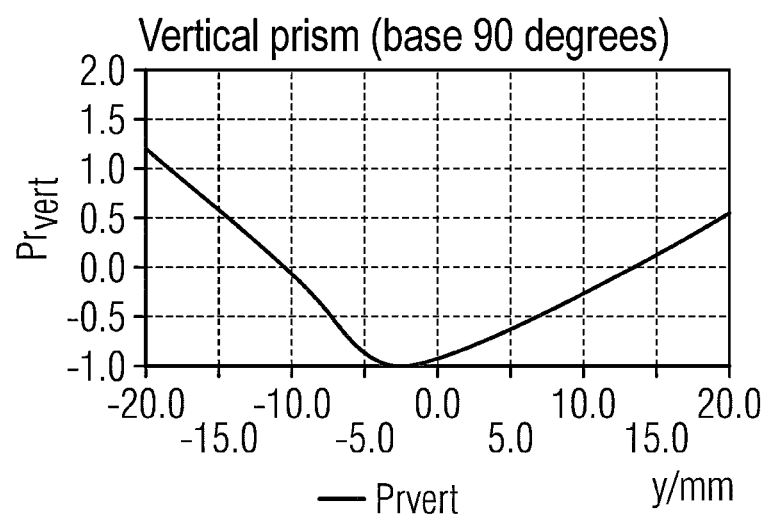
Figure 15B:
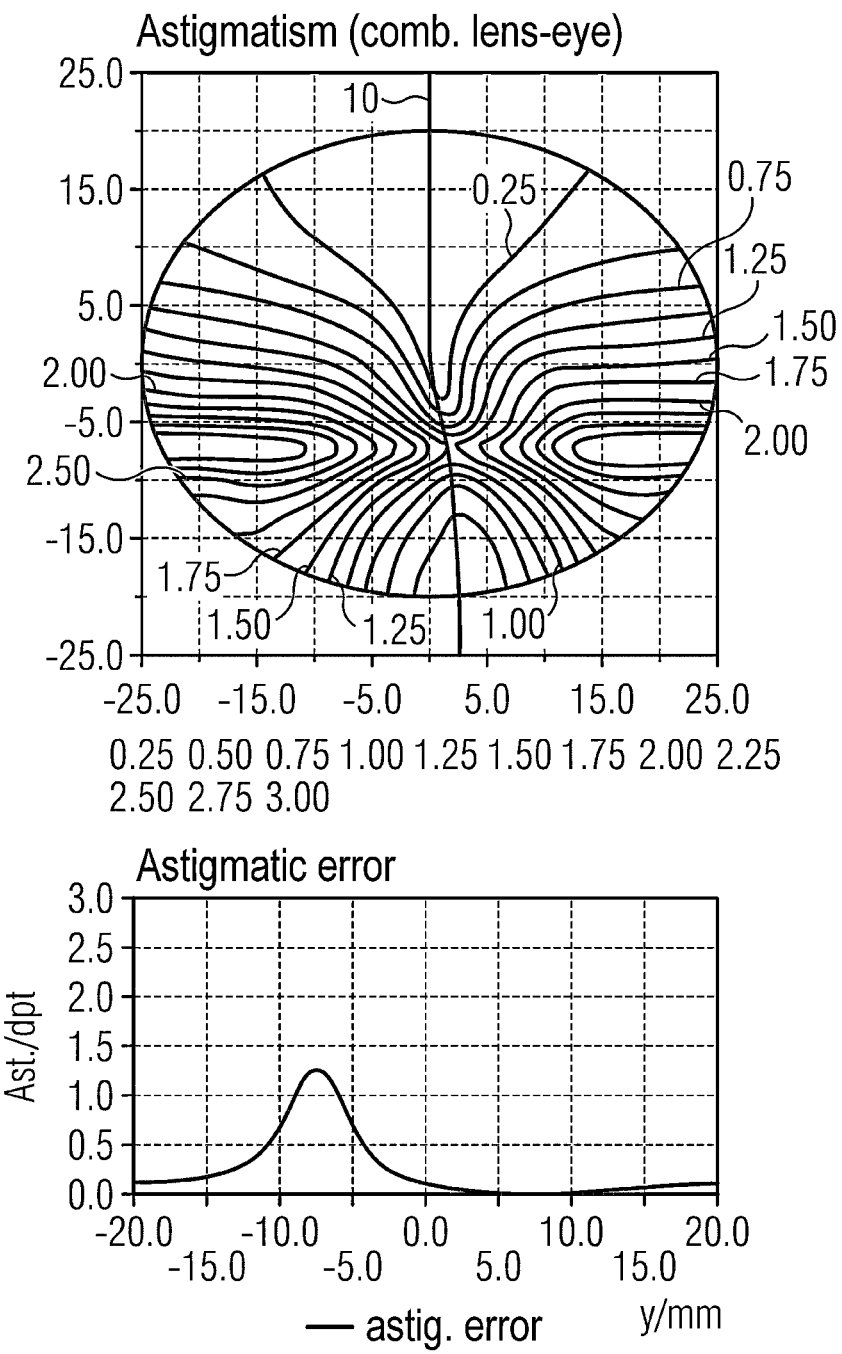
Figure 15C:
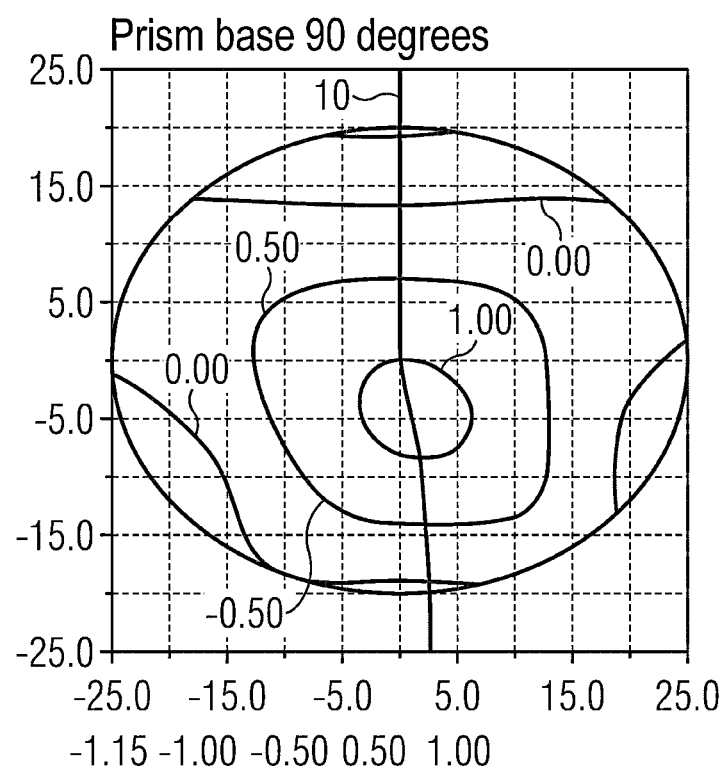
Figure 15C:
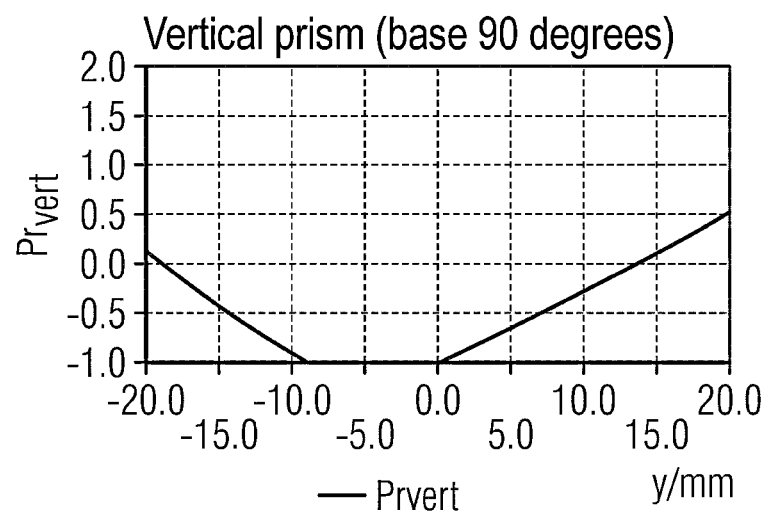

FIG. 15a-15b show an example of a realization of a short-distance prism of 1 cm/m, base 90°, given a progressive lens with a spherical effect at the far reference point Sph 1.0 dpt, astigmatism at the far reference point Ast=0.0 dpt, and an addition Add=2.0 dpt. FIG. 15a shows the isolines of the vertical prism or of the prism base 90° (above) and the course of the vertical prism along the y-axis (below). FIG. 15b shows the isolines of the astigmatism in the usage position of the lens (above) and the course of the astigmatism in the usage position of the lens along the y-axis (below). FIG. 15c shows the isolines of the vertical prism of a comparison lens without short-distance prism. The comparison lens has the same parameters (Sph, Add) as the lens shown in FIG. 15a-15b.

The vertical prism change approximately follows the refractive power increase. An astigmatic error of 1.25 dpt arises at the location of the largest prism gradient, thus in the middle of the progression zone. The short-distance region is again error-free, since here the additional vertical prism is kept constant.

Change of the Vertical Prism Over a Large Range

If the astigmatism error should be kept small, a realization via a slow rising height of the vertical prism without stabilization in the short-distance region is possible. However, the short-distance region is then no longer error-free. If only a steady change of the vertical course is produced from the far reference point BF toward the near reference point BN, but not an adaptation in the horizontal direction (see FIG. 13), an additional astigmatism is generated which corresponds to the vertical refractive power change ($A=(n-1)*c_{ver}$) and has an refractive power error of $0.5*A$, since the horizontal refractive power or the horizontal course is not adapted. If the astigmatic error at the near reference point $B_N$ should be corrected, the same refractive power change as in the vertical direction must be introduced in the horizontal direction. The refractive power at the near reference point then changes by this magnitude, thus the addition. By contrast, if the addition should be kept constant, in the horizontal direction the refractive power change must be chosen to be opposite the vertical refractive power change, and twice as great an astigmatic error is thus created. It is possible to combine the two procedures.

Figure 16:
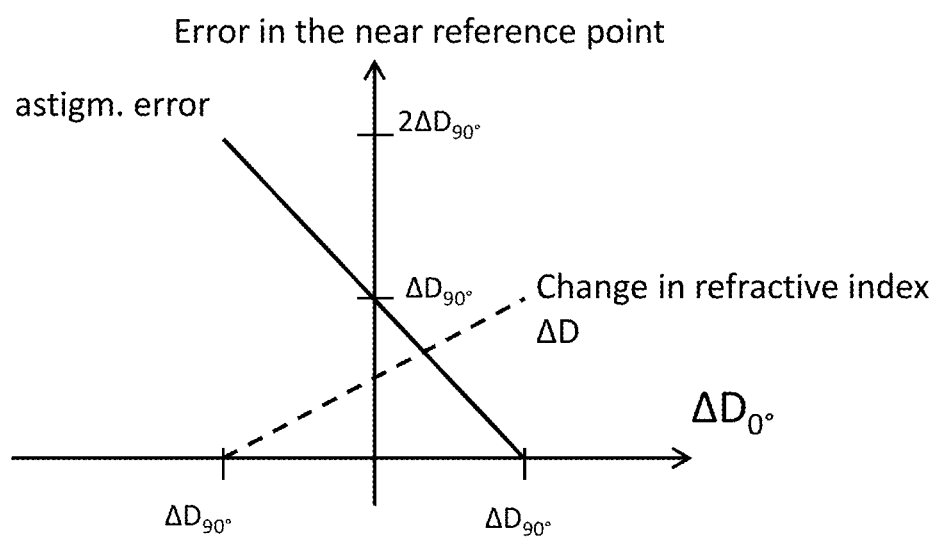
FIG. 16 possible error combinations in the near field for a given vertical refractive power change.

FIG. 16 shows possible error combinations of astigmatism and refractive power $\Delta D$ in the short-distance region for a given vertical refractive power change $\Delta D90$, depending on the refractive power change in the horizontal direction $\Delta D0°$. The solid line describes the astigmatism error, and the dashed line describes the mean refractive power change or the refractive power error. If no horizontal refractive power change is introduced, thus $\Delta D0°=0$ dpt is chosen (values on the y-axis), the introduced astigmatism is just as large as the vertical refractive power change $\Delta D90$ and the refractive power error is half as large. If the astigmatism is entirely corrected via $\Delta D0°=\Delta D90°$, the refractive power is modified to the same extent (right side of FIG. 16), and the refractive power is kept constant via $\Delta D0°=-\Delta D90°$, the astigmatism must assume twice the value of the vertical refractive power change $\Delta D90°$ (left side of FIG. 16).

As a rule of thumb, for a long progression (i.e. approximately 18 mm), it applies that the vertical refractive power change is approximately equal to the vertical prism change.

Figure 17A:
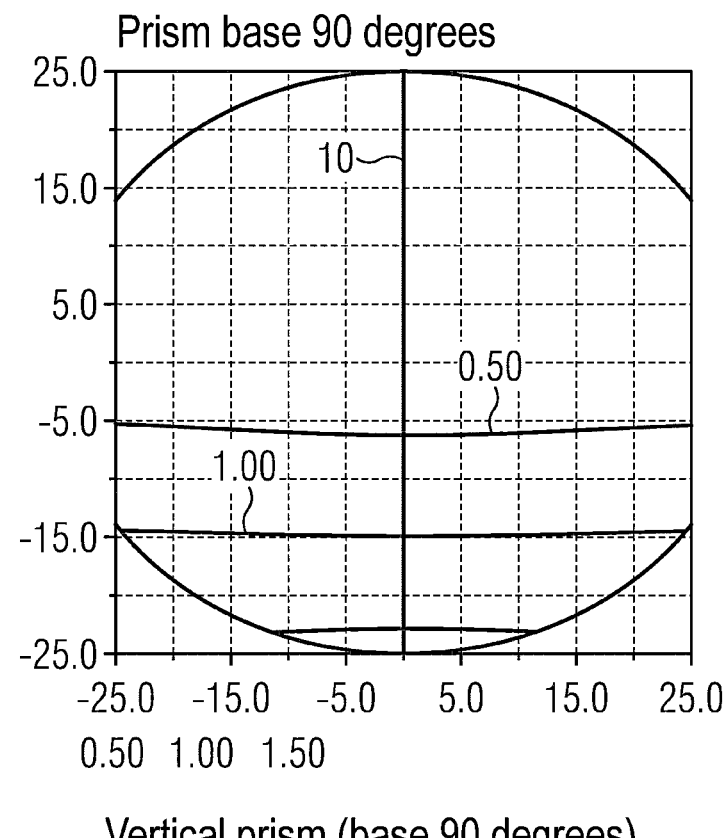
FIG. 17a-17b an example of a realization of a vertical prism of 0.75 cm/m given a single vision lens.
Figure 17A:
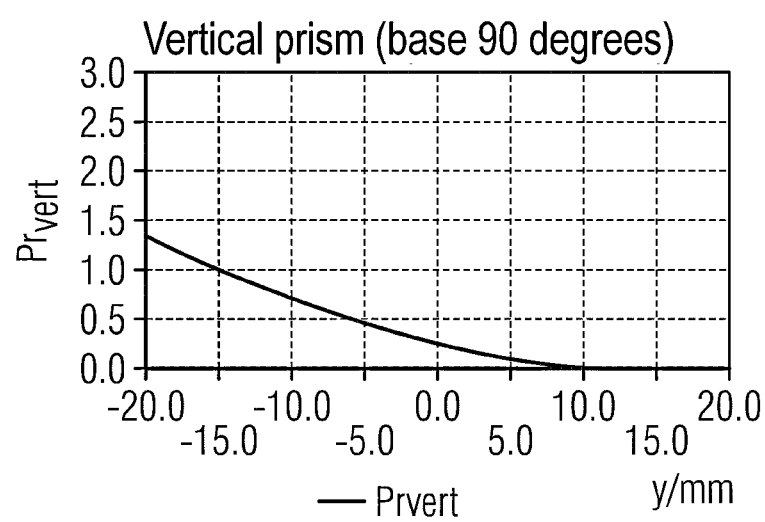
Figure 17B:
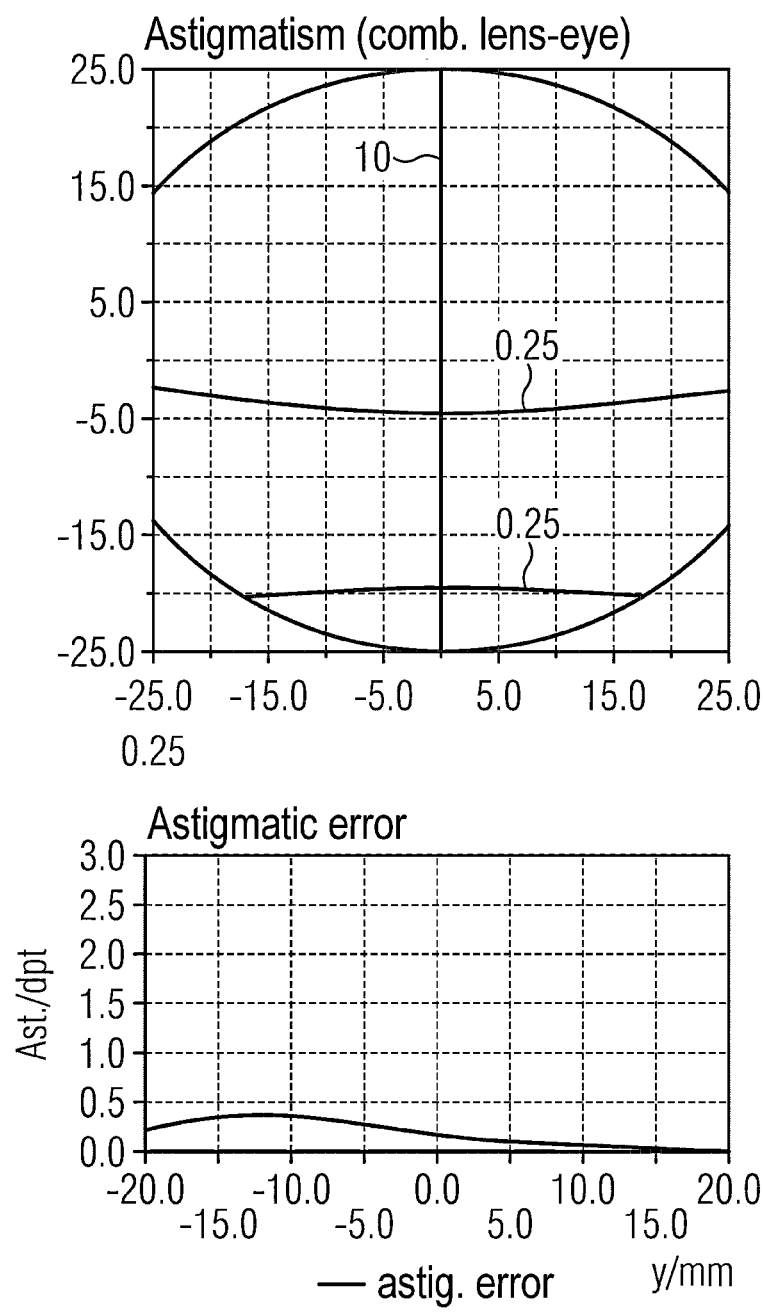

FIG. 17a-17b illustrates an example of a realization of a vertical prism of 0.75 cm/m base 90° at the near reference point $B_N$ of a single vision flat glass (i.e. Sph=0.0 dpt, Ast=0.0 dpt). FIG. 17a respectively shows the isolines of the introduced vertical prism (above) and the course of the vertical prism along the vertical or y-axis (below). FIG. 17b respectively shows the isolines of the astigmatism in the usage position of the lens (above) and the course of the astigmatism along the vertical or y-axis (below). Given the realization of such a continuous vertical prism, the following errors at the near reference point $B_N$ must be accepted (see FIG. 17b):

$Ast_{max}=0.37$ dpt

Refraction error=0.18 dpt

The short-distance portion is thus not error-free.

Consequently, with the introduction of a continuous vertical prism, a weakening of the vertical prism difference given anisometropia may be realized with smooth surfaces without bend and image discontinuity. However, astigmatic errors and refraction errors are created.

As described above, a horizontal and/or vertical prism may also be introduced via a variation of the nominal refractive power and/or of the nominal astigmatism. A vertical prism at the near reference point may, for example, be introduced in order to at least partially compensate for the prismatic vertical difference at the near reference points of the left and right lens of spectacles, to correct an anisometropia. An example of a method for correction of the vertical prismatic difference at short-distance between a right lens and a left lens of a lens pair (for example given the presence of an anisometropia) includes the following steps:

determination of a vertical prismatic difference at the near reference point $Pr_{RL}$. For example, this may take place via a measurement of the vertical prismatic difference $Pr_{RL}$ at the near reference point or via a calculation of the vertical prismatic difference $Pr_{RL}$ at the near reference point BN (exact or approximate) using the prescription values for sphere, astigmatism, and if applicable addition of a left and right lens;

specification of a personalized prism compensation $\Delta Pr_{Corr}$ that is necessary from a physiological standpoint for example $\Delta Pr_{Corr}=MAX(0.0$ cm/m, $\Delta Pr_{RL}-1.0$ cm/m);

determination of the prismatic correction values for the right and left lens $Pr_{CorrR}$ and $Pr_{CorrL}$. The prismatic correction values may be distributed uniformly or differently between the left and right lens, for example:

$Pr_{CorrR}=-Pr_{CorrL}=0.5$ $Pr_{Corr}$, i.e. uniform distribution between the right and left lens; or $Pr_{CorrR}=0.0$ cm/m, $Pr_{CorrL}=\Delta Pr_{Corr}$, i.e. compensation only on one side; or non-uniform distribution between the right and left lens;

calculation of the additional near refraction for the right and/or the left lens, i.e. the required change of the nominal refractive power and/or of the nominal astigmatism at the near reference point (as a difference of the new and the prescribed addition or nominal addition, and/or of the new astigmatism and the prescribed astigmatism or nominal astigmatism);

addition of the additional near refraction to the original near refraction, preferably in power vector notation;

calculation and optimization of the lenses, for example according to a conventional method for calculating a lens.

In particular, with the aid of Prentice's rule an optometrist may calculate to which prism difference an anisometropia leads for the single vision spectacles wearer given short-distance viewing. Based on this calculation, he may demonstrate to the spectacles wearer the prismatic difference between right eye and left eye in the measurement spectacles by means of prismatic refraction lenses. A check may thus be made as to whether the complete prismatic difference between right and left is perceived by the spectacles wearer to be compatible or incompatible. If the prismatic difference is perceived to be incompatible, the optometrist may reduce the prismatic refraction lens in terms of its value until the customer perceives it to be compatible.

The optometrist may determine a concrete prism value that the spectacles wearer can tolerate, and thus can also wear in the spectacles. He thus must compensate for the prismatic difference between right and left eye only until it has achieved a value that is indicated by the spectacles wearer as compatible. This value may represent the personalized prism compensation that is necessary from a physiological standpoint.

The correction adaptation may be performed in a monocular or binocular manner. In addition to this, as described above the prismatic difference may be corrected solely at the cost of an astigmatic error, or only at the cost of a refractive power error. A balanced distribution between refractive power error and astigmatic error is also possible.

Additional following aspects may be taken into account (individually or in combination) in the decision as to how the correction of the vertical prismatic difference may be optimally realized:

The lead eye (i.e. the dominant eye) may be provided with the better correction, i.e. with the smaller change of the prescribed refractive power and/or astigmatism.

The adaptation of the correction may take place depending on visual acuity, meaning that the eye with the better visual acuity receives the smaller change. In addition, given a high visual acuity, it may be preferred to accept a refractive power error. Expressed in a different way, given a high visual acuity it may be preferred to allow a greater refractive power error than a greater astigmatism error.

3. The change may be made depending on the level of the astigmatism and/or of the axis position; for example, too large a change to the axis position may be precluded. The change may be determined according to physiological criteria. In a physiological study, it has thus been established that, as of Cyl 0.75, the upstream placement of cylinder lenses leads to a visual acuity decline of nearly 1 grade.

4. The correction may also take place depending on the higher-order aberrations of the spectacles wearer. Given a higher spherical aberration, it may be preferred to accept a change in the refractive power. Given a higher 2nd-order astigmatism, it may be preferred to tolerate a change of the astigmatism.

The calculation of the additional short-distance refractions for the right and/or the left lens depending on the prismatic correction values may, as described above, take place under consideration of the correlation between the unwanted astigmatism, the refractive power error, and the prismatic effect (see for example FIG. 16). As a rule of thumb, for a long progression it applies that:

$$\Delta D_{90°} \approx \Delta Pr_{90},$$

meaning that vertical refractive power change≈vertical prism change.

The vertical refractive power $D_{90}$ may be modified, for example by approximately 0.5 dpt, in order to generate a change of the vertical prism of approximately 0.5 cm/m via modification of the posterior surface at the near reference point. This may be achieved via an additional near cylinder of 0.5 dpt axis 0°. The change in the horizontal section $\Delta D_{0°}$ then determines the error in the refractive power and astigmatism.

The following Tables 1A and 1B show possible combinations of refractive power errors and astigmatism errors at the near reference point in order to achieve a reduction of the vertical prismatic difference at the near reference point given the presence of anisometropia:

TABLE 1A

| $\Delta\Delta D_{0°}$ | Ast | $\Delta\Delta$Addition | Error in $B_N$ |
|---|---|---|---|
| $\Delta D_{90°}$ | 0.0 | $\Delta D_{90°}$ | only refractive power |
| 0.0 | $\Delta D_{90°}$ | ½ $\Delta D_{90°}$ | refractive power and astigmatism |
| $-\Delta D_{90°}$ | $2\Delta D_{90°}$ | 0.0 | only astigmatism |

TABLE 1B

| $\Delta\Delta D_{0°}$ | Ast | $\Delta\Delta$Addition | Error in $B_N$ |
|---|---|---|---|
| −0.50 dpt | 0.0 dpt | −0.50 dpt | only refractive power |
| 0.0 dpt | −0.50 dpt | −0.25 dpt | refractive power and astigmatism |
| 0.50 dpt | −1.00 dpt | 0.0 dpt | only astigmatism |

After the addition of the additional near refraction to the original near refraction in the power vector notation, the course of the refractive power and/or of the astigmatism along the main line may be adapted corresponding to the new near refraction values. A continuous variation of the vertical prism along the main line thereby likewise results automatically.

The lens may subsequently be calculated or optimized under consideration of the new values for the refractive power and/or the astigmatism along the main line. The optimization may take place by means of a conventional optimization method.

A few examples of the realization of a prism or of a prismatic correction in a lens are specified in the following.

Figure 18B:
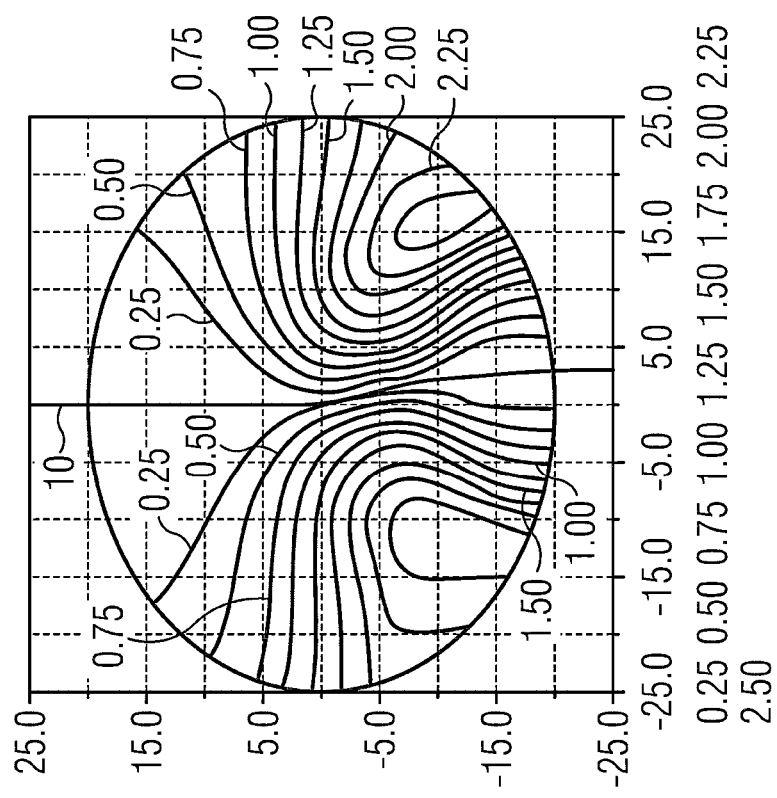
FIG. 18a-18c the astigmatism distributions of two progressive lenses (FIGS. 18a and 18b), and the resulting vertical prism difference (FIG. 18c) given a correction of an anisometropia according to the prior art.
Figure 18A:
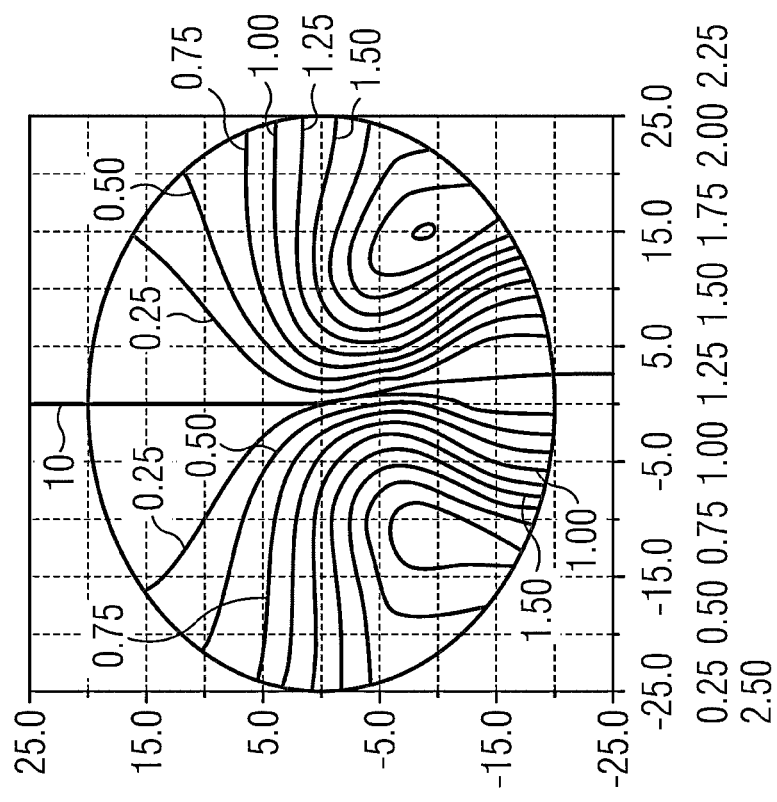
Figure 18C:
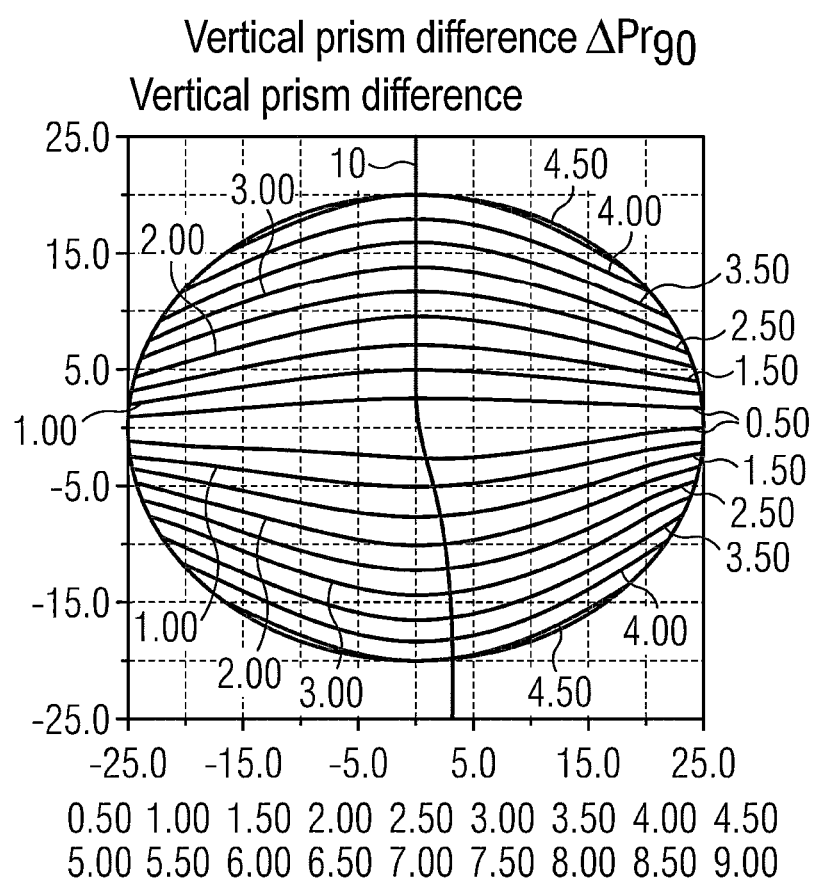

FIG. 18 illustrates the correction of an anisometropia of 2 dpt according to the current prior art in an example of two progressive lenses with an addition of 2.0 dpt. FIG. 18*a* shows the isolines of the astigmatism in the usage position of the left lens (Sph=0.00 dpt, Add=2.00 dpt), FIG. 18*b* shows the isolines of the astigmatism in the usage position of the right lens (Sph=+2.00 dpt, Add=2.00 dpt), and FIG. 18*c* shows the isolines of the vertical prismatic difference between the left and right lens. At the near reference point BN, a vertical prismatic difference of 2.84 cm/m results between the right and left lens. The high vertical prismatic difference hinders binocular vision and leads to incompatibilities of the lenses.

With the aid of the method described above, it is possible to reduce the vertical prismatic difference by 1 cm/m, to 1.84 cm/m. This may be achieved in that the short-distance refractive power is modified on the right and/or on the left such that a change to the prismatic correction at short-distance in the right and left lens results, and in fact at the height that has been predefined as being physiologically necessary. This may be achieved via an increase of the addition in the left lens by 0.25 dpt, and a weakening of the addition in the right lens by 0.25 dpt.

Figure 19B:
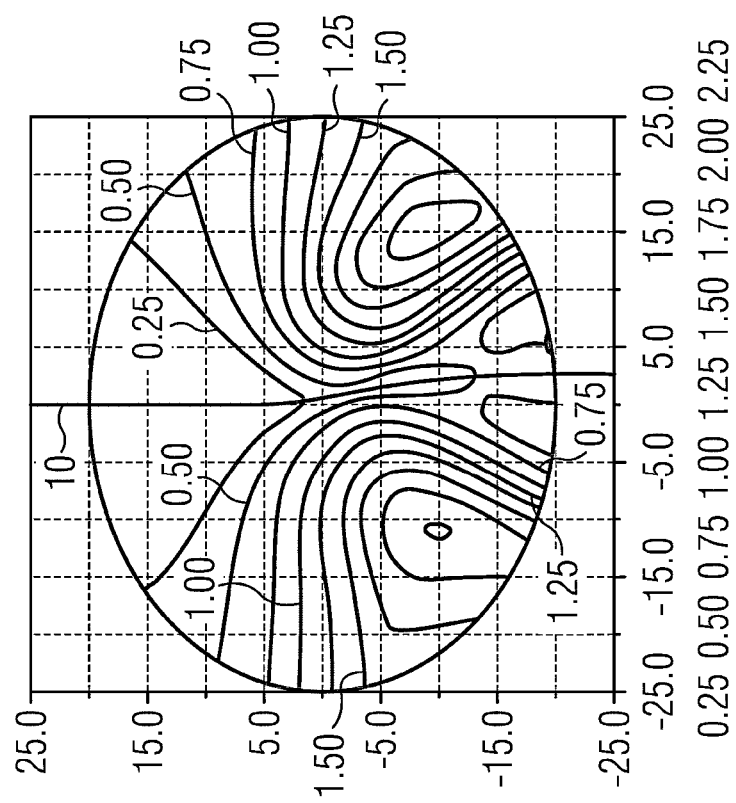
FIG. 19a-19c the astigmatism distributions (FIGS. 19a and 19b) of two progressive lenses, and the resulting vertical prism difference (FIG. 19c) given a correction of an anisometropia according to an example of the invention.
Figure 19A:
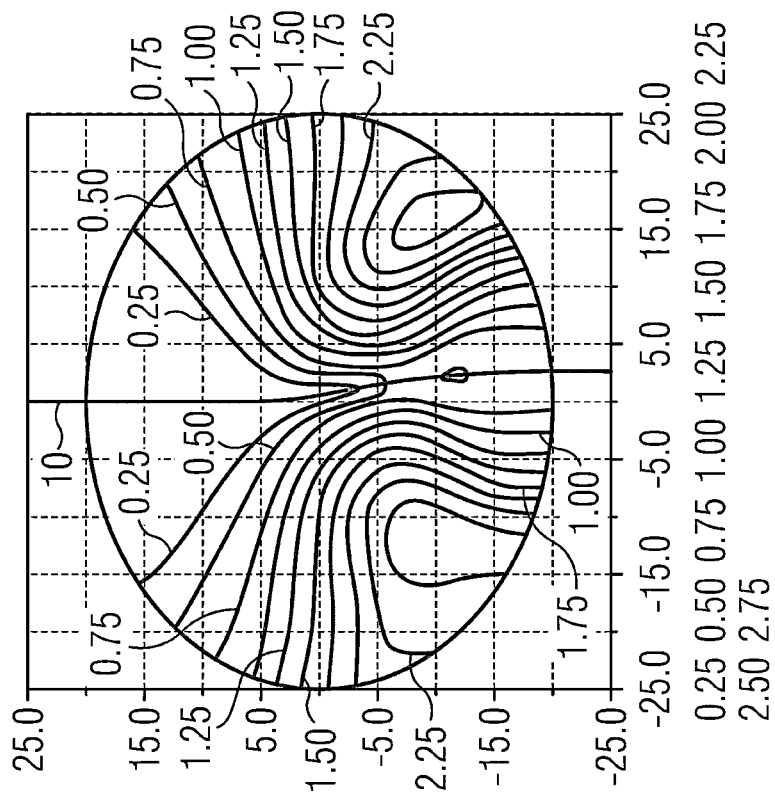
Figure 19C:
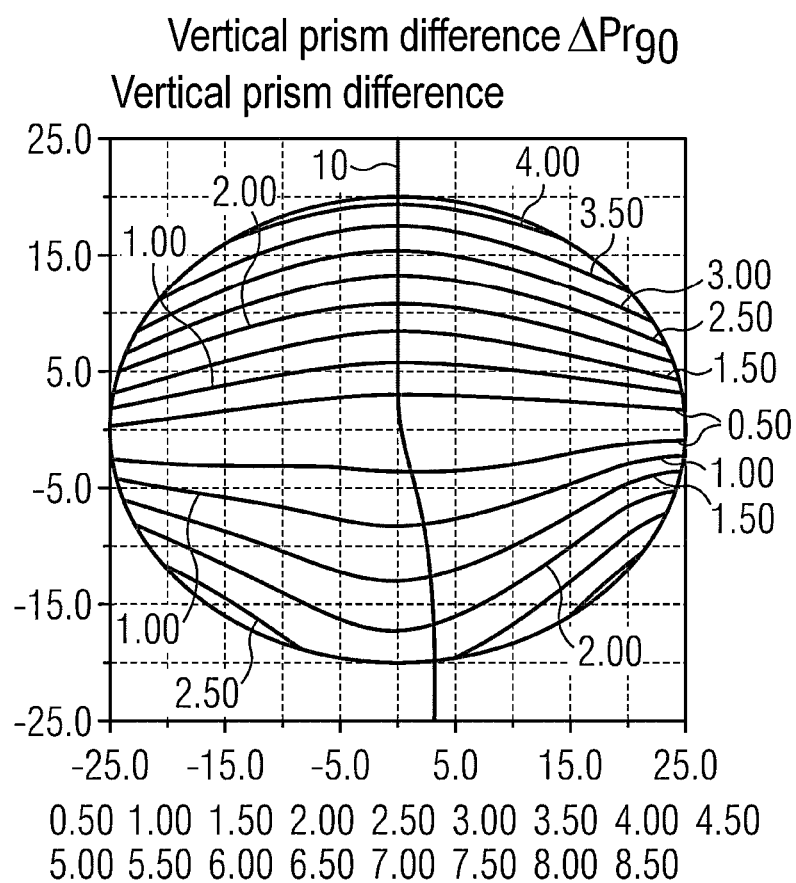

FIG. 19 illustrates the correction of an anisometropia of 2 dpt with a reduction of the vertical prismatic difference at the near reference point $B_N$ by 1 cm/m in the example of two progressive lenses with an addition of 2.0 dpt. FIG. 19*a* shows the isolines of the astigmatism in the usage position of the left lens, in which the vertical prism is increased by 0.5 cm/m at the near reference point $B_N$. This leads to an unwanted astigmatism at the near reference point of 0.5 dpt, and to an addition that is stronger by 0.25 dpt. FIG. 19*b* shows the isolines of the astigmatism in the usage position of the right lens, in which the vertical prism at the near reference point $B_N$ is reduced by 0.5 cm/m. This leads to an unwanted astigmatism of 0.5 dpt and an addition that is weaker by 0.25 dpt. FIG. 19*c* shows the isolines of the vertical prismatic difference between the left and right lens. At the near reference point $B_N$, a vertical prismatic difference of 1.84 cm/m results between the right and left lens. The vertical prismatic difference may thus be reduced by 1 cm/m from 2.84 cm/m to 1.84 cm/m. In spite of the arising astigmatic error and refractive power error, the binocular vision is improved and the compatibility of the spectacles is increased.

Described in the following is an additional example of a method for calculating or optimizing the correction values of a lens pair to correct an anisometropia of a spectacles wearer. The goal of this method is to obtain final nominal values for the refractive power and/or astigmatic effect at the reference points (far and near reference point) that are suitable to at least partially compensate for the short-distance difference of the vertical prismatic effect. The lens may accordingly be optimized so that the final nominal values for the refractive power and/or astigmatic effect are achieved at the reference points. The optimization may, for example, include a minimization or maximization of an objective function as is known from the prior art.

The initial values for the method include the prescription values or nominal values at the far reference point and near reference point for the left and right lens. The prescription values include the sphere at the far reference point for the right and left eye ($S_R$ and $S_L$), the cylinder (or the magnitude of the astigmatism) at the far reference point for the right and left eye ($C_R$ and $C_L$), the axis of the cylinder or of the astigmatism for the right and left eye (a R and $\alpha_L$), and if applicable (given progressive lenses) the addition for both eyes ($Add_R$ and $Add_L$).

In a first step, the values S(0) and S(90) that are effective at the horizontal ($\phi=0$) and vertical ($\phi=90$) meridian are calculated from the prescription values. For example, the conversion may take place according to Equation 36:

$$S(\varphi)=S1*\cos^2(\varphi-\alpha)+S2*\sin^2(\varphi-\alpha), \quad (36)$$

wherein $S1=S_{R,L}$, $S2=S_{R,L}+C_{R,L}$, and $\varphi$ is either 0° or 90°.

In a second step, the vertical prismatic effect $Pr_{90}$ at the near reference point of the respective eye is calculated. Given a known effect progression, this may take place directly via integration of S(y, $\phi=90$), otherwise may be calculated via an approximation formula, for example with Prentice's rule:

$$Pr_{90}(cm/m)=c_y(cm)*S_{90}, \quad (37)$$

wherein:
$S_{90}$ is the spherical effect in the vertical meridian, converted to the 90° meridian, and $c_y$ is the decentration or the distance between the near reference point and the prism reference point.

Since the prismatic effect likewise depends on the geometry of the surface, Prentice's rule merely represents an approximation that indicates only a portion of the actual short-distance prismatic effect. The remaining portion depends on the sphere at the far reference point, the addition, and the progression length, and may be determined by means of an interpolation of the values for different lenses with different additions, progression lengths, and spheres. The remaining portion may thus be determined in a third step, for example using an interpolation of the values of four different lenses with different additions and progression lengths and five different spherical effects at the far reference point per lens (20 combinations in total).

The final prismatic effect $Pr_{90}$ for each lens may be calculated in a fourth step as a sum of the two components or two portions:

$$Pr_{90}=Pr_{90}(\text{Prentice})+Pr_{90}(\text{Surface}), \quad (38)$$

wherein:
$Pr_{90}$ (Prentice) designates the portion of the prismatic effect that is determined according to Prentice's rule; and
$Pr_{90}$ (Surface) designates the portion of the prismatic effect that is dependent on the surface.

The difference of the vertical prismatic effect for the left and right lens may thus be calculated as follows in a fifth step:

$$\Delta Pr_{RL}=Pr_{90R}-Pr_{90L} \quad (39)$$

It is possible to at least partially compensate for or reduce this prismatic difference by means of a modification of the nominal values for the sphere and/or cylinder (astigmatism) at the near reference point.

In a sixth step, a new, theoretical addition at 90° may initially be calculated at the near reference point, which is necessary in order to at least partially compensate for the vertical prismatic difference. In particular, in a sixth step a new value is calculated at the near reference point for the sphere converted to the 90° meridian, since the addition represents the difference between the sphere at the far reference point and the sphere at the near reference point. This may take place according to the method described above. Whether the correction is applied to one of the lenses or to both lenses may thereby be taken into account.

Using this calculation, in a seventh step a new refraction a the near reference point (meaning a new sphere and/or a new cylinder or astigmatism) may be determined in order to at least partially compensate for the vertical prismatic difference. This includes a calculation of the difference $\Delta Add_{90}$ between the initial addition at 90° and the previously determined new theoretical addition at 90°. Depending on whether the addition or the cylinder or astigmatism should be modified, a corresponding difference may also be added to the addition at the near reference point that was converted to the 0° meridian. This additional difference may, for example, be 0, $-\Delta Add_{90}$, or $\Delta Add_{90}$ (see for example FIG. 16).

It is thus possible to determine correction values for the sphere and/or cylinder or for the nominal values at the near reference point ($S_{corr}$ and $C_{corr}$) that are suitable to at least partially compensate for the vertical prism difference. These correction values may be combined with the initial refraction values, for example by means of power vectors, in order to obtain the new refraction values for the near reference point.

The repetition of the second through fifth step with the new refraction values results in the new, compensated vertical prism difference (eighth step).

The lens may subsequently be optimized corresponding to the new refraction values or new nominal values (for example according to a conventional optimization method, by means of minimization or maximization of an objective function).

It is possible to specify boundary conditions or criteria for the calculation of new compensated values. For example, the boundary conditions may be the maximum allowable change of the addition and/or the maximum allowable change of the astigmatism and/or the maximum allowable prism difference. A default or standard criterion may also be that the addition is strictly positive. The calculated correction values may be compared with the corresponding boundary conditions or the criteria. Should the correction values lie outside of the allowable limits (for example, exceed the allowable maximum values), the level of the correction may be reduced until the allowable limits are complied with. The above method may thus be implemented iteratively, wherein the determined values are compared with the predetermined boundary conditions or criteria in each loop or in each cycle, and the iteration is stopped when all boundary conditions are satisfied. In order to capture and exclude errors or approximations during the iterative process, the prismatic difference may be monitored independently of the other values.

The following tables contain examples of parameters of lenses for anisometropia correction, wherein S designates the sphere, C designates the cylinder, and a designates the axis of the cylinder:

Example 1

The main criterion, or the boundary condition, in the calculation of compensated refraction values for the reduction of the vertical prism difference is that the cylinder at the near reference point is varied by not more than 1 dpt. The correction is applied to both lenses. The correction is also applied to both the addition and the cylinder at the near reference point. Table 2 contains the initial values and the determined correction values of the left (L) and right (R) lens of the lens pair.

TABLE 2

|  |  | Initial values | | Correction values | |
|---|---|---|---|---|---|
|  |  | R | L | R | L |
| Far | S | 5 dpt | 7 dpt | 5 dpt | 7 dpt |
|  | C | 1 dpt | 1.5 dpt | 1 dpt | 1.5 dpt |
|  | α | 0° | 5° | 0° | 5° |
| Near | S | 7 dpt | 9 dpt | 7 dpt | 9 dpt |
|  | C | 1 dpt | 1.5 dpt | 1.99 dpt | 0.51 dpt |
|  | α | 0° | 5° | 0° | 0° |
|  | Add | 2 dpt | 2 dpt | 2.5 | 1.51 |
|  | $\Delta Pr_{RL}$ | 3.24 cm/m | | 1.79 cm/m | |

Example 2a

The main criterion in the calculation of compensated refraction values for the reduction of the vertical prism difference is that the cylinder at the near reference point is varied by not more than 1 dpt. The correction is applied to both lenses. The correction is also applied only to the cylinder at the near reference point. Table 3 contains the initial values and the determined correction values of the left (L) and right (R) lens of the lens pair.

TABLE 3

|  |  | Initial values | | Correction values | |
|---|---|---|---|---|---|
|  |  | R | L | R | L |
| Far | S | 0.00 dpt | −1.00 dpt | 0.00 dpt | −1.00 dpt |
|  | C | 2.00 dpt | 1.00 dpt | 2.00 dpt | 1.00 dpt |
|  | α | 10° | 170° | 10° | 170° |
| Near | S | 2.00 dpt | 1.00 dpt | 2.50 dpt | 0.51 dpt |
|  | C | 2.00 dpt | 1.00 dpt | 1.00 dpt | 1.99 dpt |
|  | α | 10° | 170° | 21.54° | 175.04° |
|  | Add | 2.00 dpt | 2.00 dpt | 2.00 dpt | 2.00 dpt |
|  | $\Delta Pr_{RL}$ | 2.86 cm/m | | 1.90 cm/m | |

Example 2b

The main criterion in the calculation of compensated refraction values for the reduction of the vertical prism difference is that the cylinder at the near reference point is varied by not more than 1 dpt. The correction is applied to both lenses. The correction is also applied to both the addition and the cylinder at the near reference point. Table 4 contains the initial values and the determined correction values of the left (L) and right (R) lens of the lens pair.

TABLE 4

|  |  | Initial values | | Correction values | |
|---|---|---|---|---|---|
|  |  | R | L | R | L |
| Far | S | 0.00 dpt | −1.00 dpt | 0.00 dpt | −1.00 dpt |
|  | C | 2.00 dpt | 1.00 dpt | 2.00 dpt | 1.00 dpt |
|  | α | 10° | 170° | 10° | 170° |
| Near | S | 2.00 dpt | 1.00 dpt | 1.93 dpt | 1.02 dpt |
|  | C | 2.00 dpt | 1.00 dpt | 1.00 dpt | 1.99 dpt |
|  | α | 10° | 170° | 21.54° | 175.04° |
|  | Add | 2.00 dpt | 2.00 dpt | 1.43 dpt | 2.51 dpt |
|  | $\Delta Pr_{RL}$ | 2.86 cm/m | | 0.94 cm/m | |

Example 3

The main criterion in the calculation of compensated refraction values for the reduction of the vertical prism difference is that the cylinder at the near reference point is varied by not more than 1 dpt, and that the cylinder of the right eye is 0. The correction is applied to both lenses. The correction is also applied to both the addition and the cylinder at the near reference point. Table 5 contains the initial values and the determined correction values of the left (L) and right (R) lens of the lens pair.

TABLE 5

|  |  | Initial values | | Correction values | |
|---|---|---|---|---|---|
|  |  | R | L | R | L |
| Far | S | 0 dpt | −2.00 dpt | 0 dpt | −2.00 dpt |
|  | C | 0.50 dpt | 0.25 dpt | 0.50 dpt | 0.25 dpt |
|  | α | 0 | 15 | 0 | 15 |
| Near | S | 1.25 dpt | −0.75 dpt | 1.25 dpt | −0.74 dpt |
|  | C | 0.25 dpt | 0.50 dpt |  | 1.25 dpt |
|  | α | 15° | 0° |  | 2.87° |
|  | Add | 1.25 dpt | 1.25 dpt | 1.00 | 1.76 dpt |
|  | $\Delta Pr_{RL}$ | 3.48 cm/m | | 2.10 cm/m | |

Example 4

The main criterion in the calculation of compensated refraction values for the reduction of the vertical prism difference is that the addition is varied by not more than 1 dpt. The correction is also applied to both the addition and the cylinder at the near reference point. Table 6 contains the initial values and the determined correction values of the left (L) and right (R) lens of the lens pair.

TABLE 6

|  |  | Initial values | | Correction values | |
| --- | --- | --- | --- | --- | --- |
|  |  | R | L | R | L |
| Far | S | −5.00 dpt | −7.00 dpt | −5.00 dpt | −7.00 dpt |
|  | C | | 0.50 dpt | | 0.50 dpt |
|  | α | | 0 | | 0 |
| Near | S | −2.50 dpt | −4.50 dpt | −3.49 dpt | −4.50 dpt |
|  | C | | 0.50 dpt | | 0.50 dpt |
|  | α | | 0 | | 0 |
| Add |  | 2.50 dpt | 2.50 dpt | 1.51 dpt | 2.50 dpt |
| $\Delta Pr_{RL}$ |  | 2.23 cm/m | | 1.34 cm/m | |

Example 5

In this example, there are no limitations with regard to the correction. The correction is applied to both eyes. The correction is also applied to both the addition and the cylinder at the near reference point. Table 7 contains the initial values and the determined correction values of the left (L) and right (R) lens of the lens pair.

TABLE 7

|  |  | Initial values | | Correction values | |
| --- | --- | --- | --- | --- | --- |
|  |  | R | L | R | L |
| Far | S | 1.75 dpt | 3.25 dpt | 1.75 dpt | 3.25 dpt |
|  | C | 0.25 | | 0.25 | |
|  | α | 5° | | 5° | |
| Near | S | 3.50 dpt | 5.00 dpt | 3.50 dpt | 4.01 dpt |
|  | C | 0.25 dpt | | 1.25 dpt | 0.99 dpt |
|  | α | 5° | | 1° | 90° |
| Add |  | 1.75 dpt | 1.75 dpt | 2.25 dpt | 1.25 dpt |
| $\Delta Pr_{RL}$ |  | 1.78 cm/m | | 0.06 cm/m | |

FIG. 20 shows an example of a graphical user interface of a computer program that implements a method for calculation of a vertical and/or horizontal prism in a lens (for example a single vision lens or a progressive lens). The graphical user interface includes sections or fields that enable the desired horizontal and/or vertical prism to be input. Furthermore, the graphical user interface includes sections that enable the parameters of the superposition surface to be input and/or enables these parameters to be displayed.

FIG. 21 shows an example of a graphical user interface of a computer program that implements a method for correcting or optimizing the correction values of a lens pair to correct an anisometropia of a spectacles wearer. The graphical user interface includes sections that enable boundary conditions for the correction to be input. Furthermore, the graphical user interface includes sections that enable the initial refraction values and/or the determined correction values of the left and right lens to be specified and/or that enable these values to be displayed.

The invention claimed is:

1. A computer-implemented method for calculating or optimizing a lens, comprising:
   capturing a nominal refractive power or a nominal astigmatism at a near reference point of the lens;
   determining a correction value of a vertical or horizontal prism at the near reference point of the lens;
   modifying the nominal refractive power or the nominal astigmatism at the near reference point using the correction value of the vertical or horizontal prism of the lens;
   determining a continuous course of the nominal refractive power or the nominal astigmatism along a main line of the lens using the modified nominal refractive power or nominal astigmatism at the near reference point; and
   calculating or optimizing the lens using the modified nominal refractive power or nominal astigmatism at the near reference point and the determined course of the nominal refractive power or the nominal astigmatism along the main line.

2. The method according to claim 1, wherein the modification of initial values for the nominal refractive power or the nominal astigmatism at the near reference point comprises:
   calculating an additional refractive power or of an additional astigmatism at the near reference point of the lens, using the correction value of the vertical or horizontal prism at the near reference point of the lens; and
   adding the additional refractive power or adding astigmatism to the nominal refractive power or to the nominal astigmatism at the near reference point.

3. The method according to claim 1, wherein the determination of a correction value of the vertical or horizontal prism at the near reference point of the lens comprises:
   determining a physiologically necessary compensation of a difference between the vertical prism at the near reference point of the lens and the vertical prism at the near reference point of a second lens, wherein the second lens has an effect that differs from the effect of the lens.

4. The method according to claim 1, wherein the modification of the nominal refractive power or the nominal astigmatism at the near reference point takes place:
   depending on visual acuity,
   depending on the higher-order aberrations,
   depending on the astigmatism of the spectacles wearer, or
   depending on a dominant eye.

5. The method according to claim 1, further comprising:
   determining a continuous course of the horizontal or vertical prism along a main line of the lens, such that the value of the horizontal or vertical prism continually changes from a predetermined value to the value at the near reference point,
   wherein the calculation or optimization of the lens also takes place using the determined course of the horizontal or vertical prism along the main line.

6. The method according to claim 5, wherein the determination of a continuous course of the horizontal or vertical prism comprises:
   determining a superposition surface or of a superposition surface strip with a main line which corresponds to the main line of the lens, wherein the superposition surface or the superposition strip has the continuous change to the horizontal or vertical prism along the main line; and
   adding vertex heights of the superposition surface and the anterior or posterior surface of the lens.

7. The method according to claim 1, wherein the lens is a progressive lens.

8. A method for calculating or optimizing a lens pair for correction of an anisometropia of a spectacles wearer, comprises:
   capturing initial refraction values of each of the two lenses of the lens pair, wherein the initial refraction values include a nominal refractive power or a nominal astigmatism at a far reference point and at a near reference point; and calculating or optimizing at least one of the two lenses of the lens pair according to the method according to claim 1, wherein the vertical or horizontal prism at the near reference point of the lens to be calculated or optimized is determined depending on the difference of the initial refraction values of the two lenses of the pair.

9. A non-transitory computer program product which is configured to implement a method for calculating or optimizing a lens according to claim 1.

10. A method for producing a lens or a lens pair, comprising:

calculating or optimizing a lens according to the method for calculating or optimizing a lens according to claim 1; and manufacturing the lens so calculated or optimized.

11. A device for producing a lens or a lens pair, comprising:

a computer configured to calculate or optimize the lens according to a method for calculating or optimizing a lens according to claim 1; and a machine configured to machine the lens to a finished state.

12. A device for calculating or optimizing a lens or a lens pair, comprising:

a capturer configured to capture a nominal refractive power or a nominal astigmatism at a near reference point of the lens, or of lenses of a lens pair, and a computer configured:

to determine a correction value of the vertical or horizontal prism at the near reference point of the lens, or of at least one of the lenses of the lens pair;

to modify the nominal refractive power or the nominal astigmatism at the near reference point of the lens, or of the at least one lens of the lens pair, using the previously determined correction value of the vertical or horizontal prism;

to determine a continuous course of the nominal refractive power or of the nominal astigmatism along a main line of the lens using the modified refractive power or nominal astigmatism at the near reference point; and to calculate or optimize at least one surface of the lens, or of the least one of the lenses of the lens pair, using the modified nominal refractive power or nominal astigmatism at the near reference point and the determined course of the nominal refractive power or of the nominal astigmatism along the main line.

13. A lens having a first reference point and a near reference point, wherein:

an astigmatism at the near reference point deviates by at least 0.5 dpt from a value predetermined by a prescription for the astigmatism at the near reference point, or deviates by at least 0.5 dpt from the astigmatism at the first reference point; and a difference of a vertical prismatic effect at the first reference point and a vertical prismatic effect at the near reference point deviates by at least 0.5 cm/m from a value $\Delta Pr_{90}$; or a difference of a horizontal prismatic effect at the first reference point and a horizontal prismatic effect at the near reference point deviates by at least 0.5 cm/m from a value $\Delta Pr_{90}$, wherein $$\Delta Pr_{90} = -0.1(-2.5 + 0.05 S_{N90}^2 + (S_{F90} + 0.8 Add_{90})(y_{BN} - y_{BF}) + 0.025 Add_{90}(y_{BN}^2 - y_{NF}^2));$$

and $$\Delta Pr_0 = 0.05(S_{F0} + S_{N0})(x_{BN} + x_{BF}),$$

and wherein:

$x_{BF}$ refers to the horizontal coordinates of the first reference point;

$x_{BN}$ refers to the horizontal coordinates of the near reference point;

$y_{BF}$ refers to the vertical coordinates of the first reference point;

$y_{BN}$ refers to the vertical coordinates of the near reference point;

$S_{F90}$ refers to the refractive power in the vertical direction at the first reference point;

$S_{N90}$ refers to the refractive power in the vertical direction at the near reference point;

$Add_{90} = S_{N90} - S_{F90}$ refers to the vertical addition;

$S_{F0}$ refers to the refractive power in the horizontal direction at the first reference point;

$S_{N0}$ refers to the refractive power in the horizontal direction at the near reference point; and $Add_0 = S_{N0} - S_{F0}$ refers to the horizontal addition.

14. The lens according to claim 13, wherein the lens also has a far reference point or a centering point, and the first reference point is the far reference point or the centering point.

15. The lens according to claim 13, wherein the lens is a single vision lens or a progressive lens which has a mean spherical effect $S_N$ at the near reference point and an addition $Add = S_N - S_F$, wherein:

−6.0 dpt ≤ $S_F$ ≤ +6.0 dpt and Add ≤ 2.50 dpt.

16. A lens having two permanent markings, a first reference point, and a near reference point, wherein:

an astigmatism at a second reference point deviates by at least 0.5 dpt from a value predetermined by a prescription for an astigmatism at the near reference point, or by at least 0.5 dpt from an astigmatism at the first reference point; and a difference of a vertical prismatic effect at the first reference point and a vertical prismatic effect at the near reference point deviates by at least 0.5 cm/m from a value $\Delta Pr_{90}$, or a difference of a horizontal prismatic effect at the first reference point and a horizontal prismatic effect at the near reference point deviates by at least 0.5 cm/m from a value $\Delta Pr_0$, wherein:

$$\Delta Pr_{90} = 0.2 + 0.7008 S_F + 0.8992 S_N - 0.008 S_N^2$$

and $$\Delta Pr_0 = \frac{-s_{F0} + s_{N0}}{8}$$

and wherein:

$S_{F90}$ refers to the refractive power in the vertical direction at the first reference point;

$S_{N90}$ refers to the refractive power in the vertical direction at the near reference point;

$S_{F0}$ refers to the refractive power in the horizontal direction at the first reference point; and $S_{N0}$ refers to the refractive power in the horizontal direction at the near reference point; and the first reference point is situated centrally on the straight line connecting the markings, and the near reference point is offset downward by 16 mm and nasally by 2.5 mm relative to the first reference point.

\* \* \* \* \*